(12) United States Patent
Diao et al.

(10) Patent No.: US 10,706,525 B2
(45) Date of Patent: Jul. 7, 2020

(54) METHODS AND SYSTEMS FOR IMPROVED QUALITY INSPECTION

(71) Applicant: MIDEA GROUP CO., LTD., Foshan (CN)

(72) Inventors: Liang Diao, Foshan (CN); Haisong Gu, Foshan (CN); Tao Liu, Foshan (CN)

(73) Assignee: MIDEA GROUP CO. LTD., Foshan (CN)

( * ) Notice: Subject to any disclaimer, the term of this patent is extended or adjusted under 35 U.S.C. 154(b) by 253 days.

(21) Appl. No.: 15/986,699

(22) Filed: May 22, 2018

(65) Prior Publication Data

US 2019/0362486 A1  Nov. 28, 2019

(51) Int. Cl.
*G06T 7/00* (2017.01)
*G06K 9/62* (2006.01)
*G06T 7/11* (2017.01)

(52) U.S. Cl.
CPC .......... *G06T 7/0004* (2013.01); *G06K 9/6256* (2013.01); *G06T 7/11* (2017.01); *G06T 2207/20081* (2013.01)

(58) Field of Classification Search
CPC ...... G06K 9/4642; G06K 9/48; G06K 9/6212; G06K 9/6253; G06K 9/6256; G06T 2207/20081; G06T 7/0004; G06T 7/11
See application file for complete search history.

(56) References Cited

U.S. PATENT DOCUMENTS

| 2004/0109602 | A1 | 6/2004 | Konno et al. |
| 2008/0100844 | A1 | 5/2008 | Sali et al. |
| 2017/0169554 | A1 | 6/2017 | Karlinsky et al. |
| 2017/0186144 | A1 | 6/2017 | Chien et al. |
| 2018/0157916 | A1* | 6/2018 | Doumbouya ............ G06N 3/08 |

OTHER PUBLICATIONS

Midea Group Co Ltd, International Search Report and Written Opinion, PCT/CN2018/117259, dated Feb. 26, 2019, 8 pgs.

* cited by examiner

*Primary Examiner* — Nirav G Patel
(74) *Attorney, Agent, or Firm* — Morgan, Lewis & Bockius LLP

(57) ABSTRACT

A method of performing automated object inspection includes obtaining a plurality of test images. For each of the plurality of test images, the method includes performing independent object inspection on each of two or more sub-portions of the test image. The method further includes segmenting the test image into at least a first sub-portion of the test image and a second sub-portion of the test image; performing object inspection on the first sub-portion of the test image using a first subset of information channels of the test image and a first model trained on a first set of training images containing the first component; and performing object inspection on the second sub-portion of the test image using a second subset of information channels of the test image, and a second model trained on a second set of training images containing the second component.

17 Claims, 27 Drawing Sheets

430

470

1150

```
┌─────────────────────────────────────────────────────────────┐
│ Obtain a plurality of test images, each test image capturing a respective one of │──1152
│ a plurality of composite objects comprising two or more components              │
└─────────────────────────────────────────────────────────────┘
```

For each of the plurality of test images, perform independent object inspection on each of two or more sub-portions of the test image, wherein each sub-portion of the test image corresponds to a respective one of the two or more components of the respective composite object captured in the test image, wherein performing the independent object inspection includes ──1154

Segment the test image into at least a first sub-portion of the test image and a second sub-portion of the test image, the first sub-portion of the test image containing a first component and not containing a second component of the two or more components, and the second sub-portion of the test image containing the second component and not containing the first component of the two or more components ──1156

Perform object inspection on the first sub-portion of the test image using a first subset of information channels of the test image and a first model trained on a first set of training images containing the first component and not containing the second component ──1158

Perform object inspection on the second sub-portion of the test image using a second subset of information channels of the test image that are distinct from the first subset of information channels, and a second model trained on a second set of training images containing the second component and not containing the first component ──1160

Figure 11B

METHODS AND SYSTEMS FOR IMPROVED QUALITY INSPECTION

TECHNICAL FIELD

This relates generally to quality inspection, including but not limited to visually inspecting products in a product assembly line or during a post-production quality assurance process.

BACKGROUND

Manufacturers implement various quality control measures to reduce the amount of defective products that enter the stream of commerce. Some quality control measures involve human workers and/or devices visual inspecting products. However, current visual inspection techniques face low accuracy and low efficiency for complex object inspection and also do not provide convenient user interactions with the system. As such, challenges exist in identifying product defects for a complex product including multiple components and multiple types of defects.

SUMMARY

Accordingly, there is a need for methods and systems for performing efficient and accurate inspection of a complex product including multiple component, and each component may include different types of defects. In this way, a manufacturer is able to further reduce an amount of defective products entering the stream of commerce while also detecting the defects in such a manner that manufacturing down time is reduced and defect detection accuracy is improved.

In some embodiments, detecting and using location and orientation of reference markers to standardize captured images before performing visual inspection of the components of the composite object or the assessor pack has the advantage of high degree of an automatic process, thus more efficient and accurate. Moreover, the system can be easily modified, e.g., by updating the blueprint, or constantly performing machine learning to incorporate any updates to the model, and timely identifying defects that have been intentionally or inadvertently introduced to the assembly lines.

In some embodiments, by using a pre-segmentation process, the accuracy of the inspection system can be improved (e.g., from 80%-90% to 99.9%). The users can do the segmentation manually by select the segmented area in the standard image. The users select an obvious feature in the image and the system will use this feature for standardization. Each of the image will be orientated and scaled, so the detecting area in each of the image will be in the same size and shape. The users define the pre-segmentation area in a standard image. Each of the following standardized image will be segmented in the same way. Each of the segmented area will be trained into a single model. The system will detect object in each of the segmented area instead of in the whole image. By using these methods, the detecting accuracy will be increased greatly.

Furthermore, by manually selected or auto-extracted multiple information channels of an image, the detection efficiency and the accuracy can be improved. The system can support multiple channels input, such as RGBD. It also can extend to ultrasonic, inferred or laser. Each channel has a weight in the result of detection. The weight can be pre-defined or auto-extracted by learning in a plurality of samples or during a long-term operation.

The system supports a cloud computing framework connecting the edge devices and the server system, thus the system can handle multiple tasks simultaneously. By using a server system that leverages cloud computing power, the inspection cost can be reduced at assembly line. The system further improves efficiency with high computing power. Additionally, the system has the flexibility of using more training data from multiple assembly lines to train the model to adapt the model to different situations, or using training data from a certain assembly line to improve accuracy to target at a specific assembly line.

The current system and method can identify a defective product before entering the stream of commerce. Moreover, the cause of the defect can be identified and remedied, thereby reducing the downtime of the system. Moreover, by isolating the individual components, and the individual information channels, the training of a model can be faster, and the model can be more sensitive (e.g., due to less interference of irrelevant information from other objects or channels), producing higher inspection accuracy.

In some embodiments, a method of performing automated object inspection, comprising: at a computing device (e.g., server system 152, FIG. 1B; server system 200, FIG. 2) having one or more processors and memory, obtaining a plurality of test images, each test image capturing a respective one of a plurality of composite objects that have been assembled in accordance with a predefined common layout for the plurality of composite objects. The predefined common layout specifies respective positions for two or more components of a respective composite object, and a predefined location and orientation for a reference marker, in the respective composite object. Each test image captures respective portions of a corresponding composite object that contain the two or more components and the reference marker, and captures at least a portion of a surrounding environment of the corresponding composite object. For each of the plurality of test images, the method comprises quantitatively determining a respective transformation from a predefined contour of the reference marker in the predefined common layout to a respective anchor contour corresponding to the reference marker as captured in the test image. The method further comprises applying an inverse of the respective transformation to at least a portion of the test image to obtain a respective regularized version of the test image, such that the reference markers captured in the respective regularized versions of the plurality of test images share an image-independent location and orientation. The method also comprises performing independent automated inspection on each of two or more sub-portions of the respective regularized versions of the test images. Each sub-portion of the respective regularized versions of the test images corresponds to a respective one of the two or more components of the respective composite object captured in the test image.

In accordance with some embodiments, a system includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause performance of the operations of any of the methods described herein.

In some embodiments, a method of performing automated object inspection, comprising: at a computing device (e.g., server system 152, FIG. 1B; server system 200, FIG. 2) having one or more processors and memory, obtaining a plurality of test images, each test image capturing a respective one of a plurality of composite objects comprising two or more components. For each of the plurality of test images, the method includes performing independent object inspection on each of two or more sub-portions of the test image. Each sub-portion of the test image corresponds to a respective one of the two or more components of the respective composite object captured in the test image. Performing the independent object inspection includes segmenting the test image into at least a first sub-portion of the test image and a second sub-portion of the test image, the first sub-portion of the test image containing a first component and not containing a second component of the two or more components, and the second sub-portion of the test image containing the second component and not containing the first component of the two or more components. The method comprises performing object inspection on the first sub-portion of the test image using a first subset of information channels of the test image and a first model trained on a first set of training images containing the first component and not containing the second component. The method further comprises performing object inspection on the second sub-portion of the test image using a second subset of information channels of the test image that are distinct from the first subset of information channels, and a second model trained on a second set of training images containing the second component and not containing the first component.

In accordance with some embodiments, a system includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 11B is another flow diagram illustrating a method of performing automated object inspection on an assembly line, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first edge device could be termed a second edge device, and, similarly, a second edge device could be termed a first edge device, without departing from the scope of the various described embodiments. The first edge device and the second edge device are both edge devices, but they are not the same edge devices.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1A:
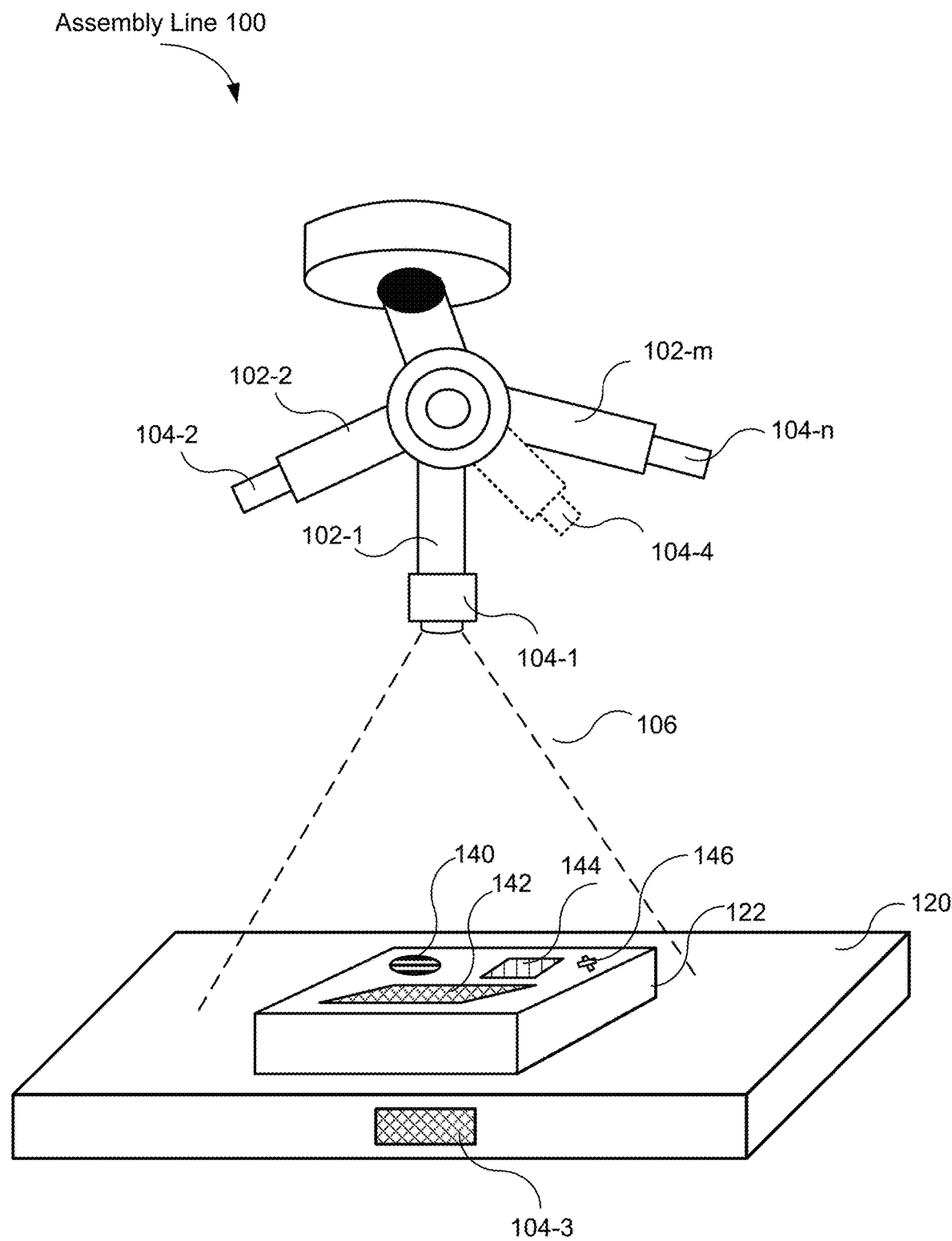
FIG. 1A is an exemplary arrangement of a plurality of edge devices on an assembly line, in accordance with some embodiments.

FIG. 1A is an exemplary arrangement of a plurality of edge devices 104 on an assembly line 100, in accordance with some embodiments. The assembly line 100 includes a work surface 120 (or a work platform). In some embodiments, the work surface 120 conveys products through the assembly line 100. In some embodiments, the work surface 120 may move continuously along a certain direction to convey one or more products 122 for inspection on the assembly line 100. Alternatively, the embodiments described herein apply equally to packaging, assembly, or manufacturing processes. In some embodiments, the work surface 120 is stationary. For example, the work surface 120 may be a surface of a three-dimensional printer, a computer numerical control (CNC) milling machine, or any other non-assembly line based manufacturing and/or inspection process. In some embodiments, a product 122 is a composite product. In some embodiments, a composite product 122 includes a plurality of components (also referred to as a multi-component product) that are coupled to each other in a predefined design. For example, the composite product 122 is an electric fan including a head coupled to a platform.

In some embodiments, a composite product 122 is an accessory pack including multiple objects (e.g., the accessory pack 122 including multiple objects 140, 142, and 144 and a reference marker 146, FIG. 1A) that have been assembled in accordance with a predefined common layout. For example, the composite product 122 is an accessory box packed with various accessories, such as electric cables, battery pack, instruction manual, and a tool kit.

In some embodiments, the assembly line 100 includes one or more edge devices 104-1, 104-2, 104-3, . . . 104-n located over the work surface 120 towards the product 122 that is placed on the work surface 120 for inspection. In some embodiments, the edge devices 104-1, 104-2, 104-3, . . . 104-n are installed on respective robotic arms 102-1 . . . 102-m that are configured to adjust the locations and/or orientations of the respective edge devices to obtain inspection data (e.g., images or other types of sensory data) of the product 122. In some embodiments, the edge devices 104-1, 104-2, 104-3, . . . 104-n include various sensors configured to collect data related to defects of the product 122 on the assembly line 100 and perform an automated object inspection (e.g., including steps as discussed with reference to FIGS. 11A-11B) of the product 122 by analyzing the data collected during the inspection. In some other embodiments, the edge devices 104-1, 104-2, 104-3, . . . 104-n collect data related to defects of the product 122 and then transmit the inspection data to a server system (e.g., server system 152, FIG. 1B) to perform the automated object inspection (e.g., as discussed with reference to FIGS. 11A-11B).

In some embodiments, to inspect the product 122, each edge device 104-1, 104-2, 104-3, . . . 104-n is a type of sensor device configured to capture a certain characteristic data (corresponding to a certain type of sensory data) of the product 122. For example, the first edge device 104-1 is a camera (e.g., a color camera, a black/white camera, or an infrared camera) configured to capture an image of the product 122. For example, a color camera 104-1 includes sensors and color filters configured to obtain different primary color information (e.g., three RGB primary colors) of a captured image. The different primary color information of a captured image can be used to train separate models corresponding to respective primary colors for visual inspection to improve accuracy. In some embodiments, the second edge device 104-2 is a depth sensor (e.g., a time-of-flight camera or a range imaging camera, such as a LiDAR system) that resolves distance by measuring time-of-flight of light signal between the edge device 104-2 and a surface of an object of the product 122. Alternatively, the depth sensor can be an ultrasound sensor or any other suitable sensors. In some embodiments, the third edge device 104-3 is weighing sensor configured to obtain a weight of the product 122. The weighing sensor may be located within or below the work surface 120. In some embodiments, one or more other edge devices 104-4 . . . 104-n include various other types of sensors (e.g., touch-sensors, vibration sensors, sound sensors, haptic sensors, temperature sensors, light sensors, movement sensors, etc.) for collecting information about the state of the composite product 122 and the assembly line 100. In some embodiments, the first edge device 104-1 (e.g., a camera, a depth camera, a video camera, or a three-dimensional camera, etc.) is used to identify a first type of product defect (e.g., surface defects), and the second edge device 104-2 (e.g., an infrared camera, an X-ray camera, etc.) is used to identify a second type of product defect (e.g., internal defects).

In some embodiments, the edge devices are positioned at fixed locations around the assembly lines or inspection stations. In some embodiments, the edge devices are actuated and positioned by one or more robotic arms (e.g., a robotic arm 102) around the assembly lines or inspection stations. In some embodiments, a certain edge device, e.g., the camera 104-1, is configured to capture images of the product 122 from the same position (e.g., the same distance to the work surface 120, the same angle towards a standard placing position to position the product 122 on the work surface). Although not shown, each of the edge devices 104-1, 104-2, 104-3, . . . 104-n is supported by a support apparatus or is mounted in some other manner. These supports or mounts have been removed for ease of illustration.

In some embodiments, the edge devices 104-1, 104-2, 104-3, . . . 104-n send the data collected during inspection of the product 122 to the server system 152 (FIG. 1B) to leverage the processing power of the server system 152. In some embodiments, the edge devices 104-1, 104-2, 104-3, . . . 104-n send the data to the server system 152 at a predetermined interval, after identifying a product defect, or after identifying some other irregularity. The server system processes the data received from the edge devices 104-1, 104-2, 104-3, . . . 104-n to potentially record and report the product defect. In some embodiments, in processing the data, the server system analyzes individual unique characteristic of the product received from each of the edge devices 104-1, 104-2, 104-3, . . . 104-n. For example, the server system trains a respective model using training data obtained from a corresponding edge device and uses the respective model to analyze the test data obtained from the corresponding edge device to determine whether the product contains a certain defect. In some embodiments, the server system updates the respective models based on the identified defects detected during testing. In some embodiments, the server system sends the respective models to the edge devices 104-1, 104-2, 104-3, . . . 104-n to have the edge devices perform defect inspection after receiving the inspection data. In this way, the production line 100 implements machine learning allowing the edge devices to dynamically identify and account for product defects (e.g., flag the defective product so that it does not enter the stream of commerce).

Figure 1B:
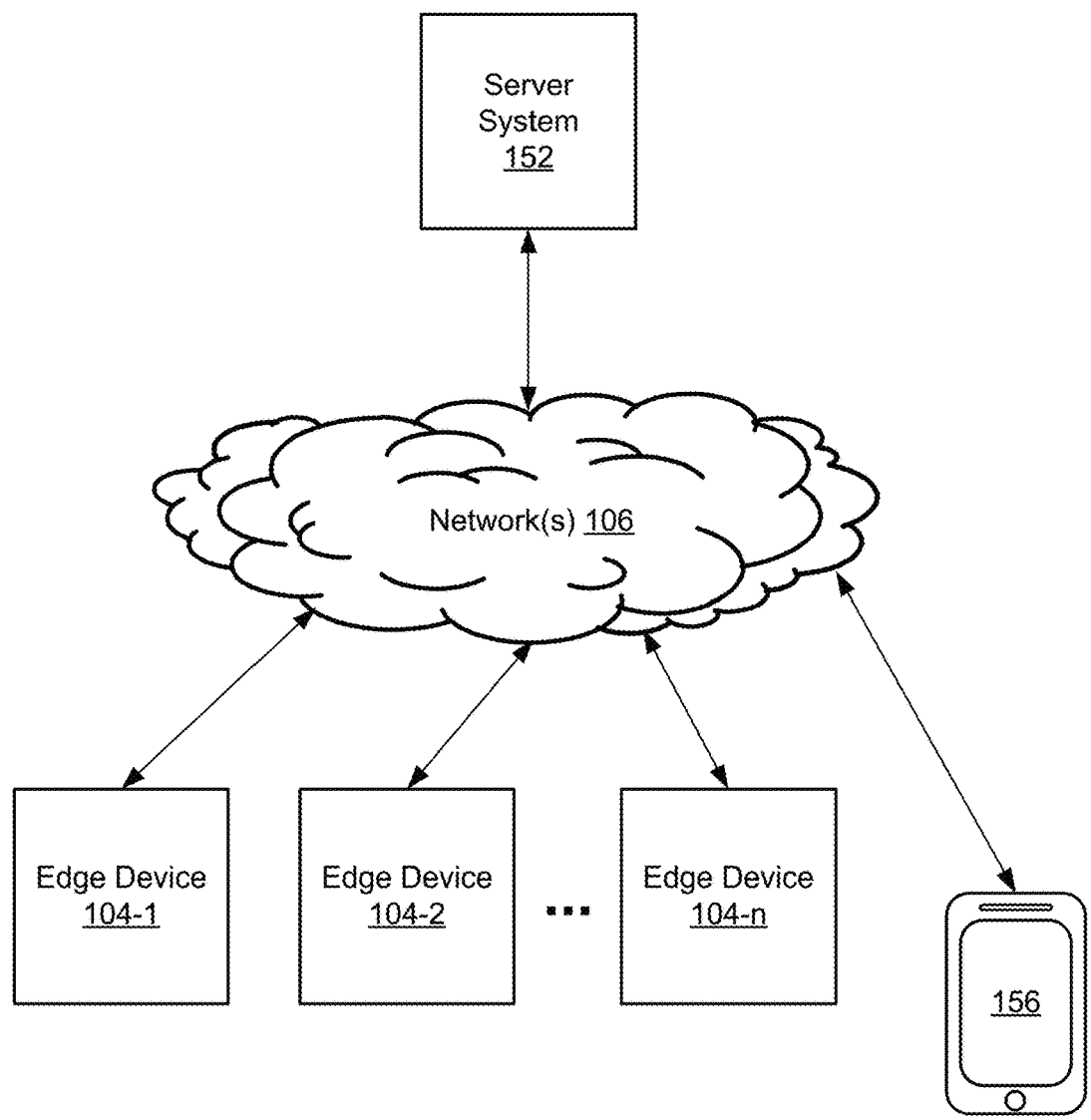
FIG. 1B is a block diagram illustrating an exemplary network architecture of a system for performing visual inspection of an assembly line, in accordance with some embodiments.

FIG. 1B is a block diagram illustrating an exemplary network architecture 150 of a system for performing visual inspection of an assembly line (e.g., the assembly line 100, FIG. 1A) in accordance with some embodiments. The network architecture 150 includes a number of edge devices 104-1, 104-2, . . . 104-n communicably connected to a server system 152 by one or more networks 106. In some embodiments, the network architecture 150 further comprises a mobile device 156 that can be carried by mobile quality control personnel. For example, the personnel could use the mobile device 156 to capture an image or capture any other types of data of the product 122, and the captured image and/or data can be processed by the mobile device 156 or transmitted to the server system 152 to detect whether the product includes any defects.

In some embodiments, the edge devices 104-1, 104-2, . . . 104-n are electronic devices that can communicate with the server system 152, each other, and other devices. In some embodiments, the server system 152 is a single computing device such as a computer server, while in other embodiments, the server system 152 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

The edge devices 104-1, 104-2, . . . 104-n are used to inspect (e.g., monitor) the assembly line 100 for product defects. In some embodiments, the edge devices 104-1, 104-2, . . . 104-n monitor an operation of the assembly line 100 (e.g., monitor movements of an operator). In some embodiments, the edge devices 104-1, 104-2, . . . 104-n monitor an operation's effect on a product (e.g., perform quality control). The edge devices 104-1, 104-2, . . . 104-n capture unique perspectives of the operation (e.g., capture unique perspectives of a product and/or unique perspectives of an operator performing an operation). To do this, each of the edge devices 104-1, 104-2, . . . 104-n includes one or more sensor devices, such as a camera, an infrared camera, an X-ray camera, a depth camera, etc. The goal being that the edge devices 104-1, 104-2, . . . 104-n can identify product defects (or collect data that can be used to identify product defects) and report to the system to improve the production process. In some embodiments, the edge devices 104-1, 104-2, . . . 104-n send the captured data to the server system 104.

In some embodiments, the network architecture 100 may also include third-party servers (not shown). In some embodiments, third-party servers are associated with third-party service providers that provide additional data the server system 152 (e.g., weather data and personnel data).

Figure 2:
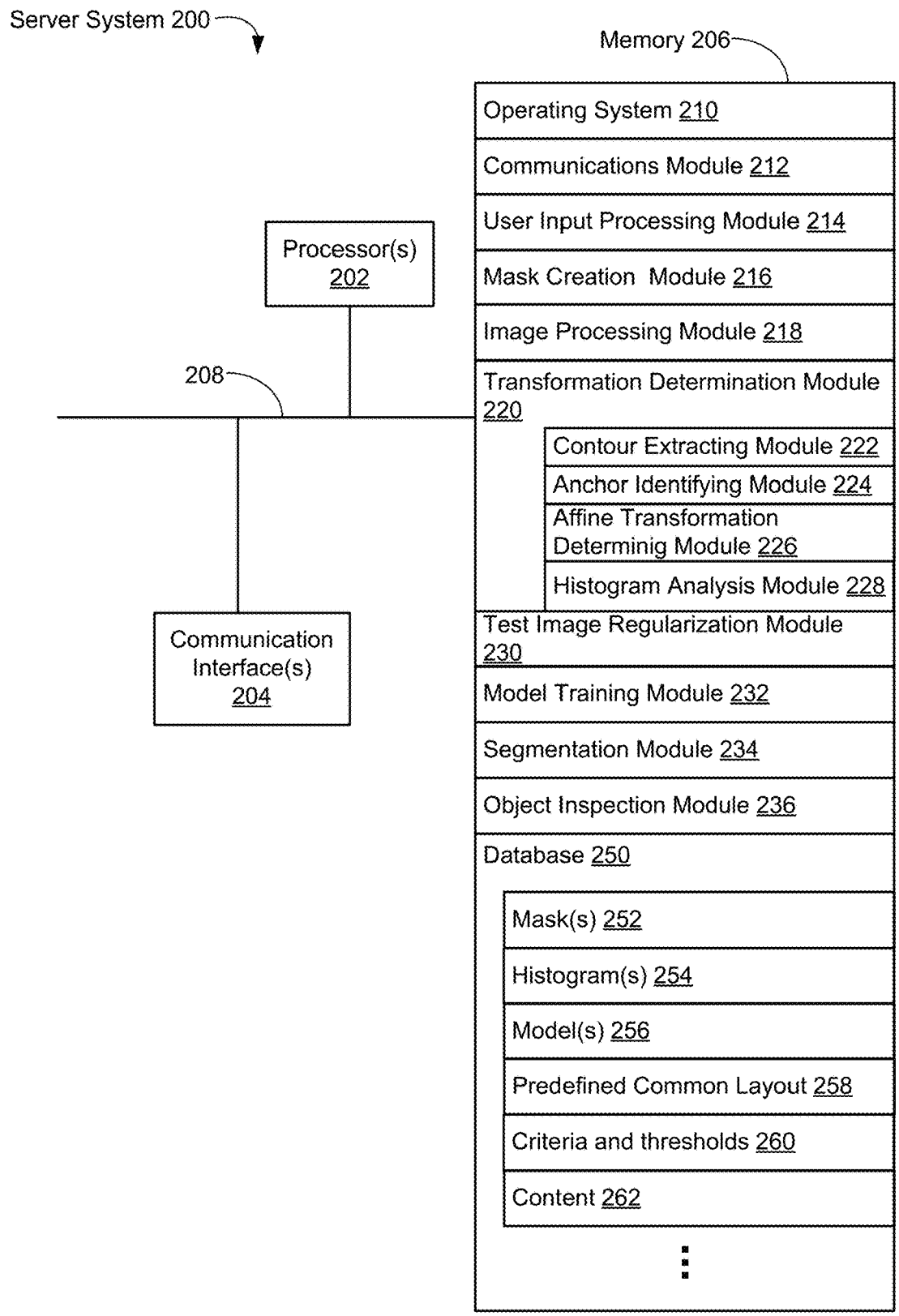
FIG. 2 is a block diagram illustrating an exemplary server system, in accordance with some embodiments.

FIG. 2 is a block diagram illustrating an exemplary server system 200, in accordance with some embodiments. In some embodiments, the server system 200 is an example of a server system 154 (FIG. 1B). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

an operating system 210 that includes procedures for handling various basic system services and for performing hardware-dependent tasks;

a network communication module 212 that is used for connecting the server system 200 to other computers (e.g., edge devices 104-1, 104-2, . . . 104-n, and/or third party servers) via the one or more communication network interfaces 204 (wired or wireless) and one or more communication networks 106 (FIG. 1B), such as the Internet, cellular telephone networks, mobile data networks, other wide area networks, local area networks, metropolitan area networks, and so on;

a user input processing module 214 that is used for receiving and processing user input;

a mask creation module 216 for creating masks used for training and inspection processes;

an imaging processing module 218 for receiving captured images from the camera, compressing the images to low-resolution images, applying masks, and cropping respective components of the images;

a transformation determination module 220, including
  a contour extracting module 222 for extracting contours of patterns of an image;
  an anchor identifying module 224 for identifying an anchor (e.g., a reference marker) of an image;
  an affine transformation determining module 226 for determining an affine matrix between the anchor of a standardized image and the anchor of a test image; and
  a histogram analysis module 228 for calculating histogram including translation offset and angular shift from a standardized image to a test image;

a test image regularization module 230 for applying an inverse of the affine transformation to standardize a test image;

a model training module 232 for training models using machine learning/deep leaning processes;

a segmentation module 234 for performing pre-segmentation of a test image to identify respective components of an image;

an object inspection module 236 for performing inspection of a test image using models; and a server database 250 for storing data associated with the server system, such as:
  one or more masks 252;
  one or more histograms 254;
  one or more models 256;
  one or more predefined common layout 258;
  one or more criteria and thresholds 260; and
  content 262.

The content 262 can include data received from the edge devices, such as unique perspectives captured by the edge devices. In addition, the content 262 can include models and views generated by the server system (or models and views received from one or more edge devices). In some embodiments, the content 262 includes text (e.g., ASCII, SGML, HTML), images (e.g., jpeg, tif and gif), graphics (e.g., vector-based or bitmap), audio, video (e.g., mpeg), other multimedia, and/or combinations thereof.

The server database 250 stores data associated with the server system 200 in one or more types of databases, such as text, graph, dimensional, flat, hierarchical, network, object-oriented, relational, and/or XML databases.

In some embodiments, the server system 200 stores in memory a graph of the edge devices. For example, the graph identifies each edge device on a particular production line and connections between each edge device. The connections may include a position of the edge device, an orientation of the edge device, neighboring edge devices, etc. By maintaining the graph, the server system 200 is able to determine how unique perspectives relate to one another.

Figure 3A:
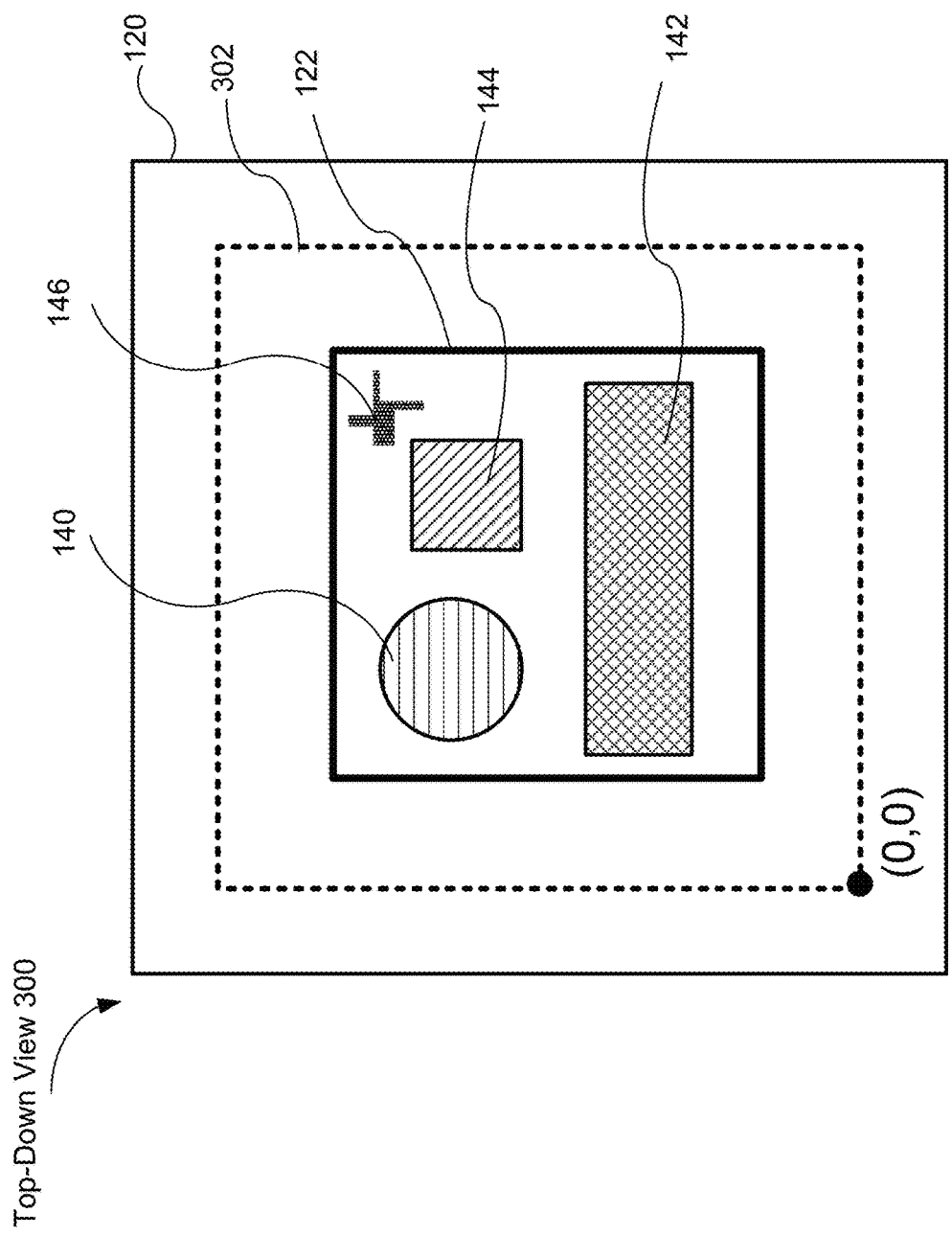
FIG. 3A is an exemplary image illustrating a top-down view showing an exemplary view of a composite 1 product placed on the assembly line, in accordance with some embodiments.

FIG. 3A is an exemplary image illustrating a top-down view 300 showing an exemplary view of a composite product (e.g., the product 122) placed on the assembly line, in accordance with some embodiments. In some embodiments, the top-down view 300 includes a camera view 302 that is captured by the edge device 104-1 as shown in FIG. 1A, when the product 122 is placed on the work surface 120 of the assembly line 100. In some embodiments, the product 122 is an accessory pack including a plurality of objects 140, 142, and 144, and a reference marker 146. In some embodiments, the reference marker 146 is a printed mark, hole, or protrusion, that is predesigned to have an asymmetric pattern and has a fixed location and orientation on the product or the accessory box, such that the orientation and lateral position of the product or the accessory box can be deduced accurately once the location and orientation of the reference marker 146 is determined.

Figure 3B:
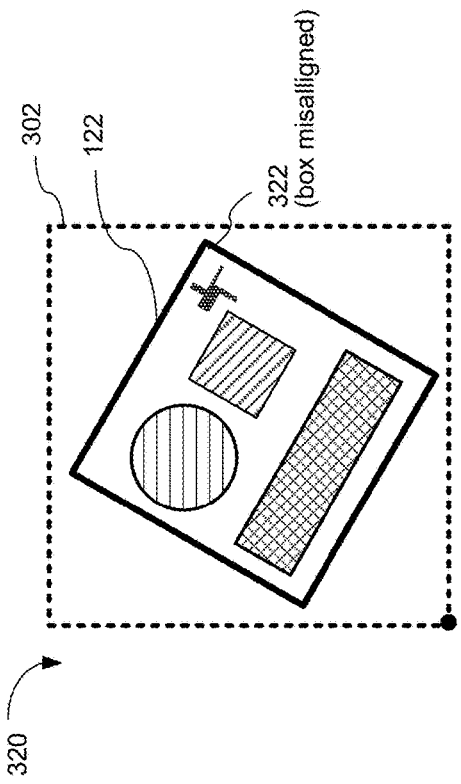
FIGS. 3B-3E are exemplary images illustrating various defects of a composite object under inspection on an assembly line, in accordance with some embodiments.
Figure 3D:
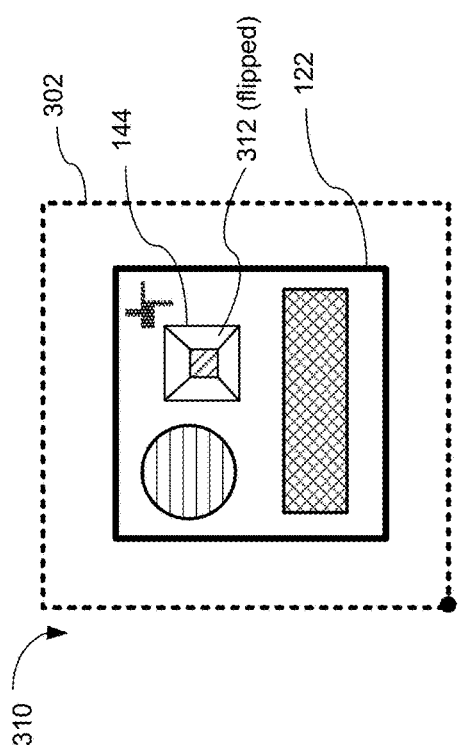
Figure 3C:
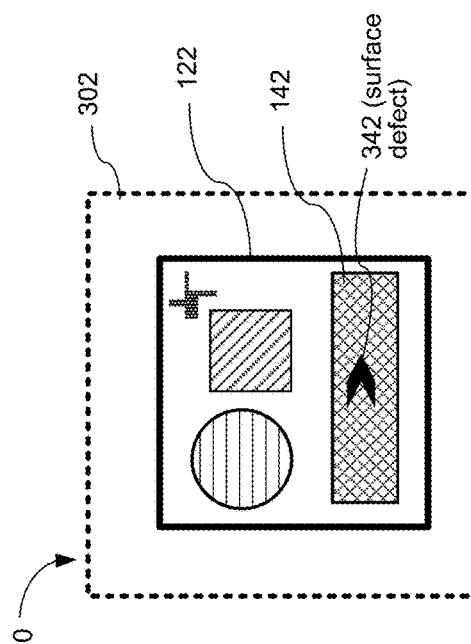
Figure 3E:
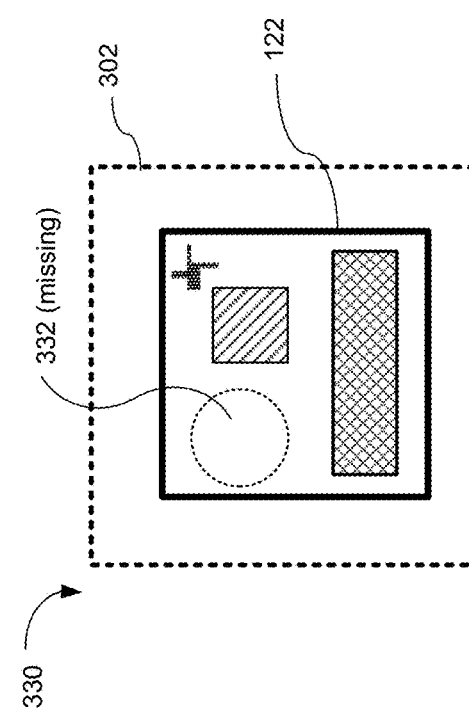

FIGS. 3B-3E are exemplary images illustrating various defects of the composite product 122 under inspection on the assembly line 100, in accordance with some embodiments. In some embodiments as shown in FIG. 3B, a defect to the product 122 exists when an object 144 that is placed upside down 312 in the product 122 (e.g., an accessory pack). In some embodiments, because the product 122 may be dropped and/or pushed into the camera view 302 after they are assembled, they may be of slightly different lateral positions and rotational angles on the table, even if they are all laid flat on the table. For example, as shown in FIG. 3C, the product 122 includes a defect when the product is misaligned 322, e.g., placed tilted relative to a standard location and orientation of the product 122 on the assembly line 100. In some embodiments as shown in FIG. 3D, the product 122 has a defect when an object (e.g., the object 140 as shown in FIG. 3A) is missing 332. In some embodiments as shown in FIG. 3E, one or more objects, e.g., the object 142 of the product 122 includes one or more surface defects 342, such as scratches, blemishes, visible cracks, abrasion, corrosion, and/or debris. One or more edge devices 104-1 . . . 104-$n$ are used to detect one or more defects associated with the product 122 using the system and method as discussed herein so as to identify a defective product before entering the stream of commerce. The defects can be identified efficiently and timely, thereby reducing the downtime and cost for product inspection.

Figure 4C:
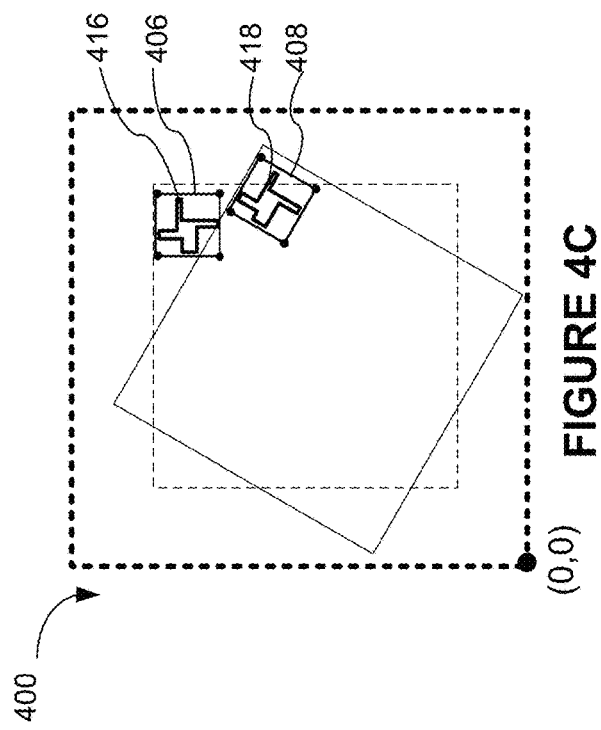
FIGS. 4A-4F illustrate a process of performing object detection and reference marker alignment to a product placed on an assembly line for inspection, in accordance with some embodiments.
Figure 4A:
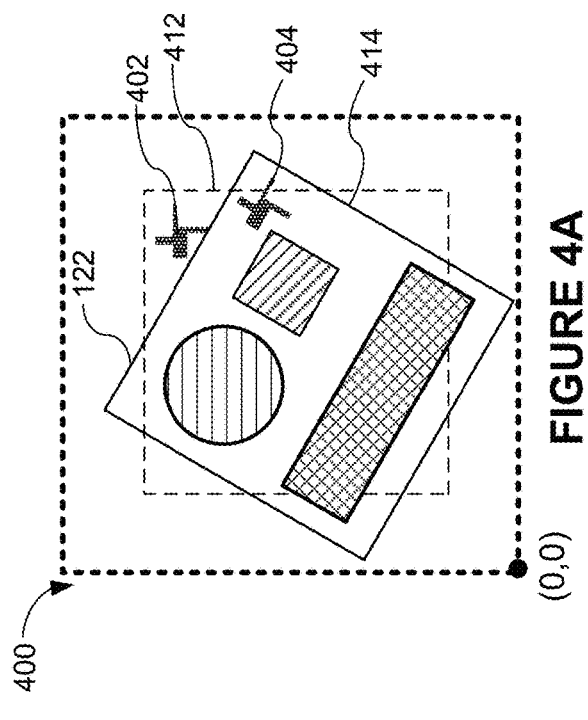

FIGS. 4A-4F illustrates a process of performing object detection and reference marker alignment to a product placed on an assembly line for inspection, in accordance with some embodiments. As shown in FIG. 4A, when the product 122 is placed on the assembly line, the product 122 may be shifted and/or rotated from a standard position 412 of the product 122 with the reference marker at position 402 to a misaligned location 414 of the product 122 with the reference marker at position 404. In some embodiments, the product 122 includes a reference marker (e.g., reference marker 146, FIG. 3A) at a fixed location and orientation relative to the product 122. The reference marker is used to determine the orientation and lateral position of the product 122 at the misaligned location 414 relative to the standard position 412.

Figure 4B:
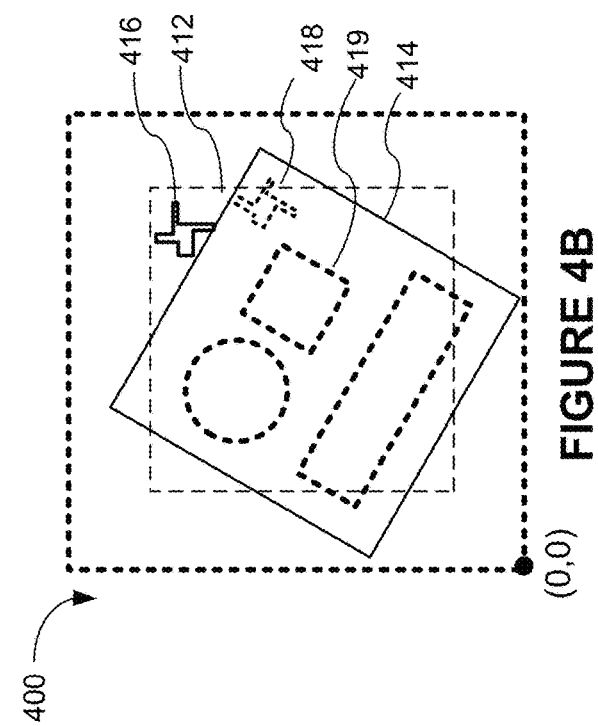
Figure 4E:
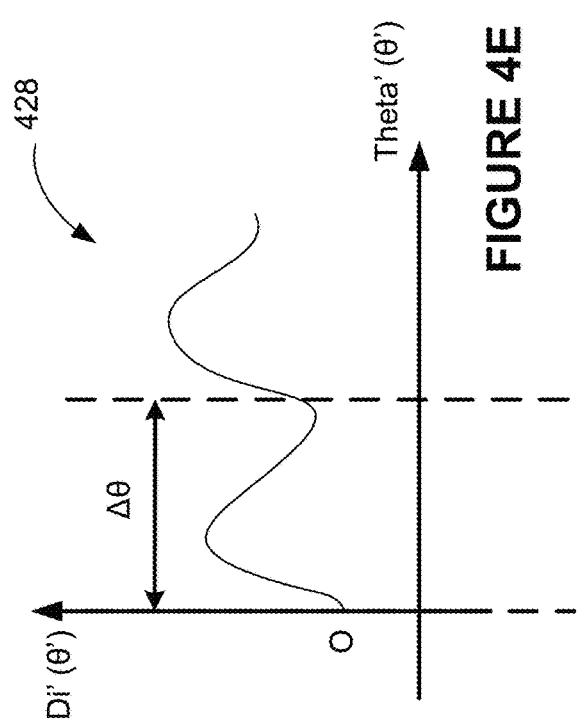
Figure 4F:
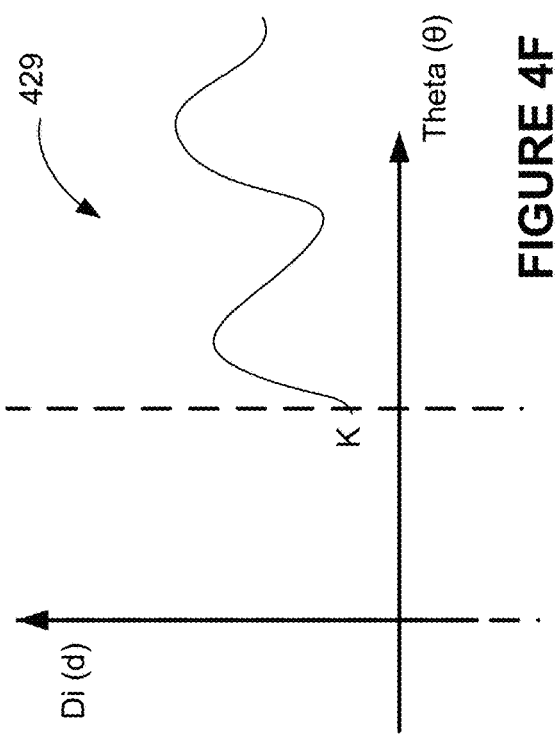
Figure 4D:
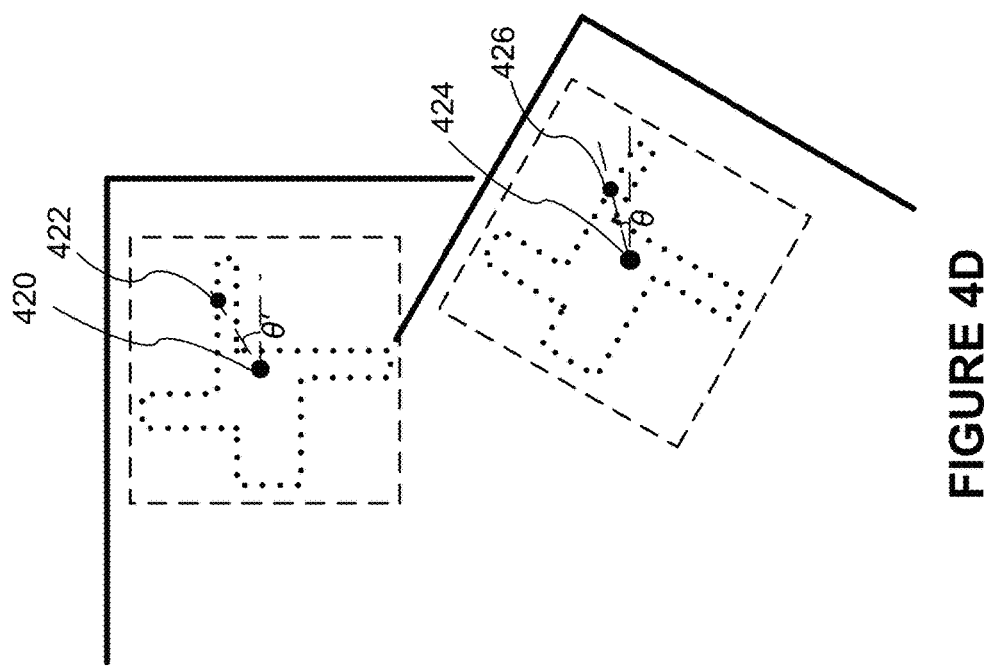
Figure 4G:
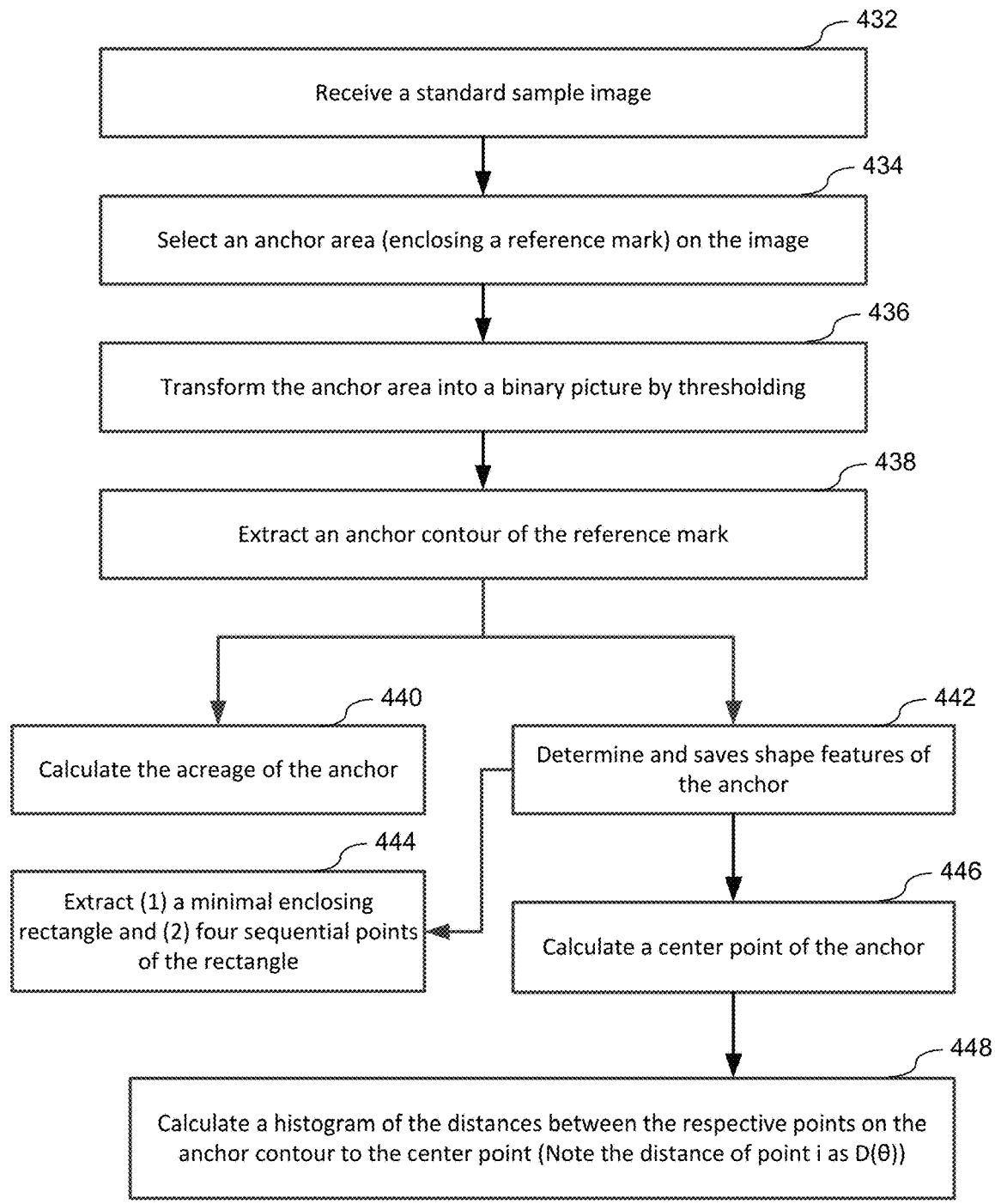
FIGS. 4G-4J are flow diagrams illustrating four main processes of object detection and alignment as illustrated in FIGS. 4A-4F, in accordance with some embodiments.
Figure 4H:
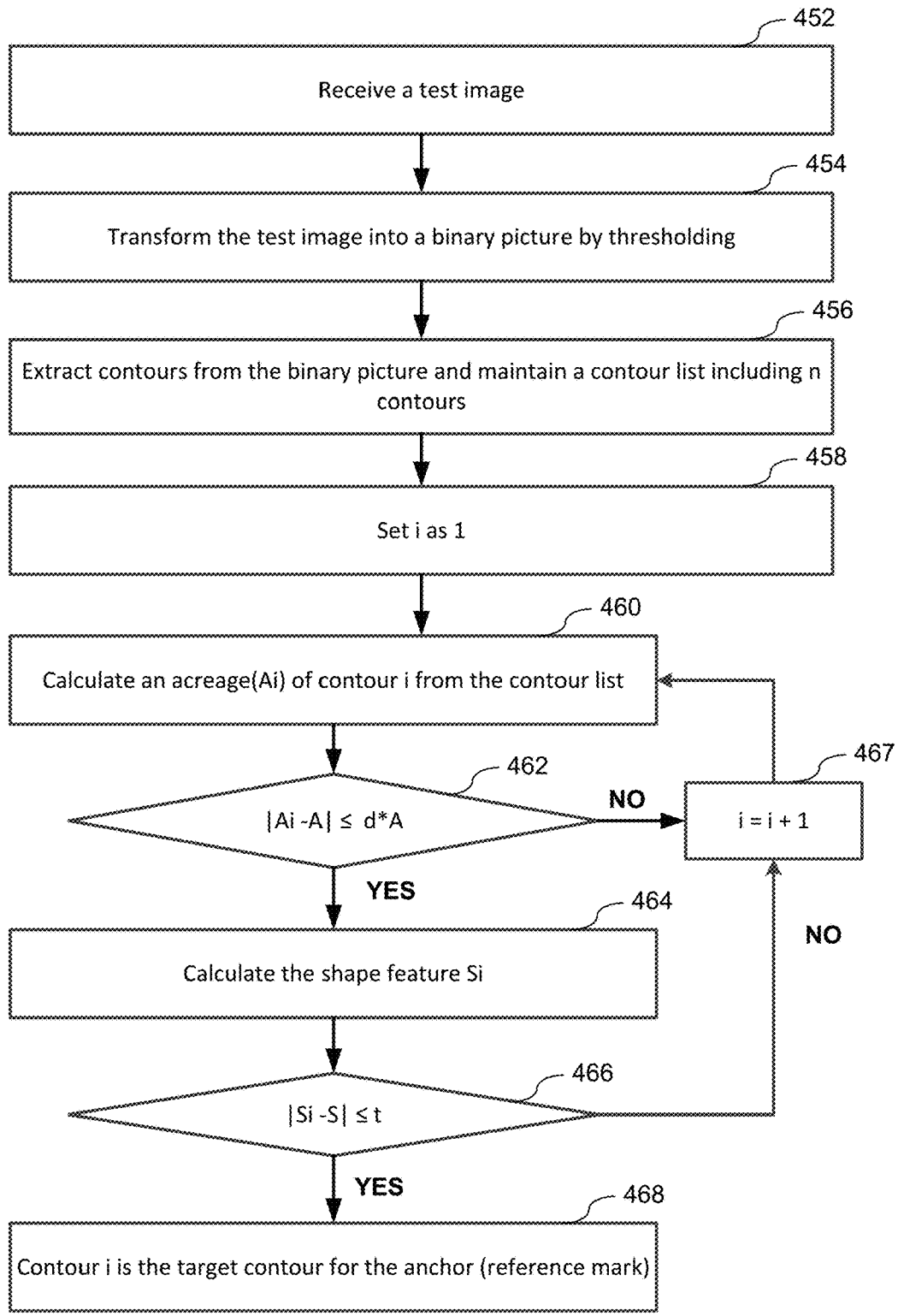
Figure 4I:
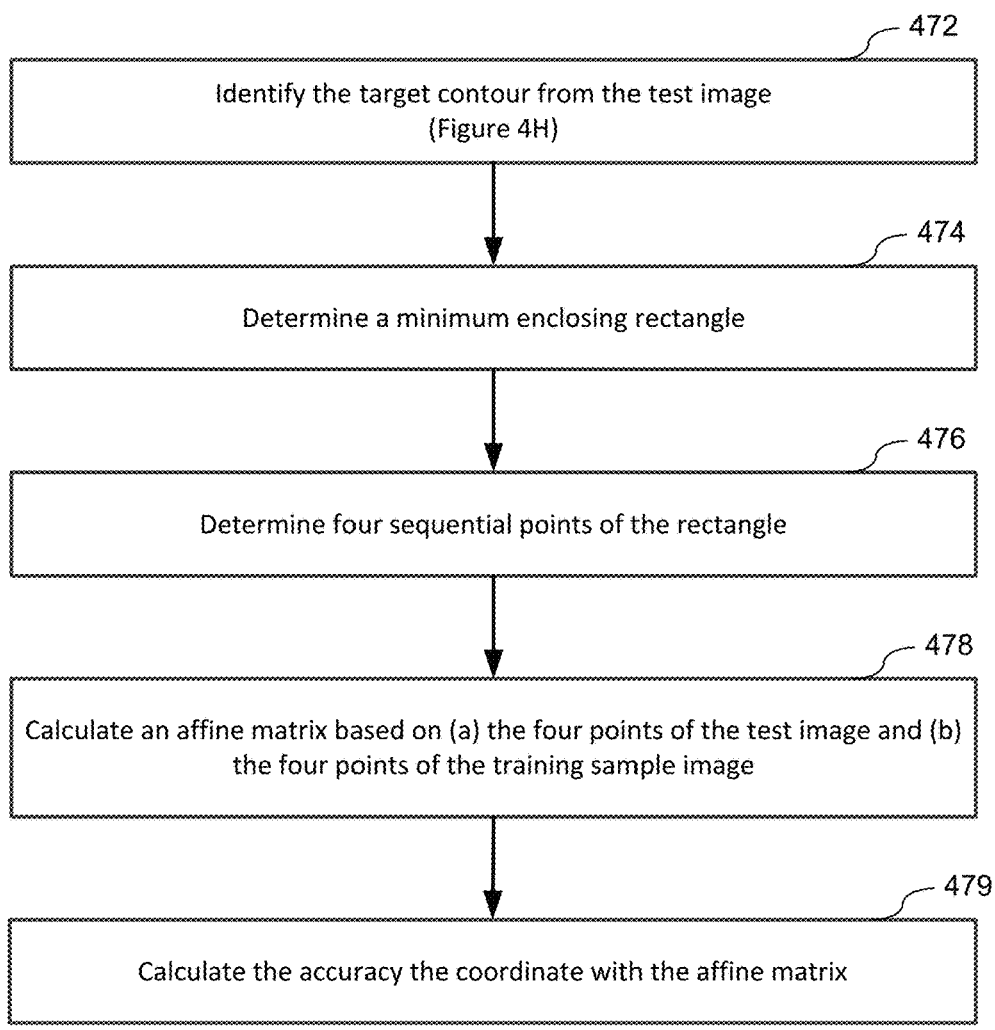
Figure 4J:
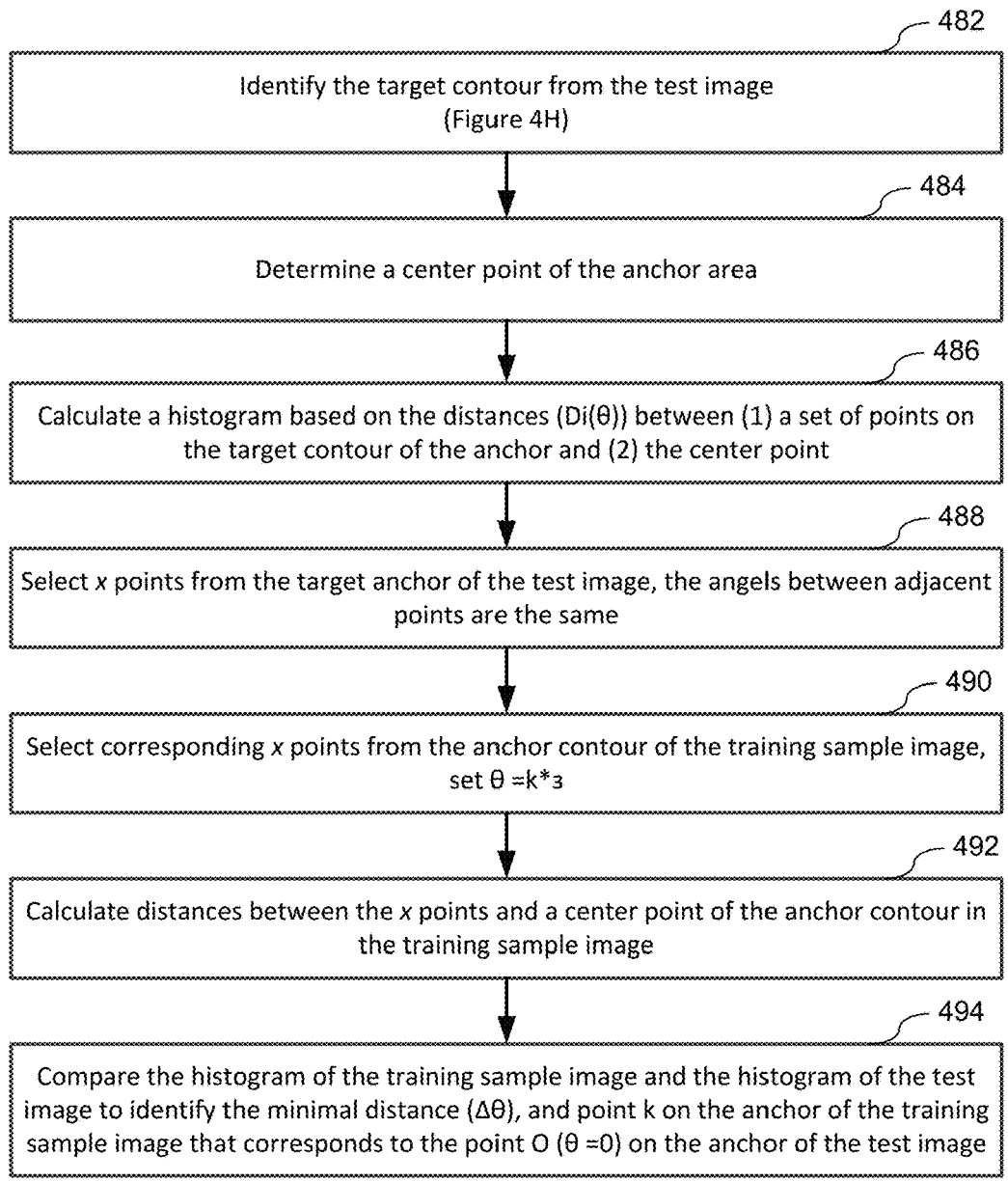

FIGS. 4G-4J are flow diagrams illustrating four main processes of object detection and alignment as illustrated in FIGS. 4A-4F, in accordance with some embodiments. The first process 430 as illustrated in FIG. 4G is related to objection detection and alignment performed to a standard sample image. The second process 450 as illustrated in FIG. 4H is related to an anchor detection performed to a test image captured on the assembly line. The third process 470 as illustrated in FIG. 4I is related to a first method of detecting key points on the anchor contour and determining an affine matrix based on the detected key points of the test image. The fourth process 480 as illustrated in FIG. 4J is directed to a second method of key points detection on the anchor contour and affine matrix calculation. In some embodiments, the steps of the processes illustrated in FIGS. 4G-4J are performed by the server system 152. In some embodiments, one or more steps of the processes illustrated in FIGS. 4G-4J are performed by one or more edge devices 104 and/or the mobile device 156.

In performing the process 430 in FIG. 4G, the server system receives (432) a standard sample image (e.g., camera view 302 of FIG. 3A) captured by the edge device 104-1. In some embodiments, the standard sample image shows one or more objects placed or assembled in a predefined common layout. In some embodiments, the predefined common layout is a blueprint of the design of the product 122. In some other embodiments, the common layout is an image captured by the camera located over the assembly line 100 of a standard example of the product 122 placed at a standard position 412 (e.g., upright and squarely aligned in the center of the table) on the assembly line.

The server system then selects (434) an anchor area (not shown) which encloses the reference marker 402 on the standard sample image. In some embodiments, the server system selects the anchor area using an image recognition technique or a machine learning process. In some embodiments, the anchor area is selected by a user's manual input. For example, when the standard sample image from the camera view 302 is displayed on the user's mobile device 156, the user can use one or more input devices (e.g., touch screen, keypad, stylus, etc.) of the mobile device 156 to select the anchor area.

The server system transforms (436) the anchor area in the standard sample image into a binary picture using a thresholding process. For example, an intensity value of the anchor area at each pixel is compared with a predetermined threshold value. One or more pixels in the anchor area are replaced with black pixels in accordance with determinations that the intensity values of these pixels are less than the predetermined threshold value. On the other hand, one or more pixels in the anchor area are replaced with white pixels in accordance with determinations that the intensity values of these pixels are greater than the predetermined threshold value. The thresholding process can be performed automatically by the system.

The server system further extracts (438) an anchor contour (e.g., anchor contour 416, FIG. 4B) of the reference marker at position 402 in the standard sample image 412 using any suitable imaging processing technique. After determining the anchor contour 416, the server system also calculates (440) the acreage (A) of the anchor (e.g., the area enclosed by the anchor contour of the reference marker). Additionally, the server system determines and saves (442) shape features, such as the number of local maximum distances from the center point 420 of the anchor contour 416 to each point along the anchor contour 416. In some embodiments as illustrated in FIG. 4C, the server system extracts (444) a minimal enclosing rectangle 406 that encloses the anchor contour of the reference marker. The server system further extracts (444) four sequential points of the rectangle 406 as shown in FIG. 4C. The server system then calculates (446) a center point 420 of the anchor as shown in FIG. 4D. Additionally, the server system calculates (448) a histogram 428 as shown in FIG. 4E of distances $D'(\theta')$ between the point 420 of the anchor contour 416 and each of a sequence of n equally spaced points (including point i 422, 4D) on the anchor contour (e.g., adjacent points are 360/n degrees apart or 360/m degrees apart with m>n and n points sequentially located to each other). As shown in FIG. 4D, $\theta'$ indicates an angle between a line connecting the center point 420 and point i 422, and a horizontal line.

For example, as shown in FIG. 4E, the x axis represents an angle between (1) a line connecting a point i 422 on the anchor contour and the center point 420 and (2) a horizontal line. The point i 422 is selected to be $$P_{traini} = (P_{txi}, P_{tyi}) \quad (1)$$

The center point 420 is $$CP_{train} = (C_{tx}, C_{ty}) \quad (2)$$

The distance between the point i 422 and the center point 420 is $$D'(\theta') = \sqrt{(P_{txi} - C_{tx})^2 + (P_{tyi} - C_{ty})^2}$$

$$\theta' = \arctan\frac{(P_{tyi} - C_{ty})}{(P_{txi} - C_{tx})}$$

Proceeding to the second process 450 in FIG. 4H, the server system receives (452) a test image captured by the edge device 104-1 from the assembly line. In some embodiments as show in FIG. 4A, the test image includes the product 122 placed in the misaligned position 414 with the reference marker at position 404. The server system transforms (454) the test image into a binary picture. The server system then extracts (456) one or more contours (e.g., contours 418, 419) of one or more image patterns recognized from the binary picture. In some embodiments, the server system maintains (456) a contour list including n (n=1, 2, . . . ) recognized contours from the binary picture. After extracting all the contours from the binary image, the server system then examines each of the n recognized contours to identify the contour for the reference marker 404 (FIG. 4A). The server system starts from a first contour by setting (458) i as 1, and calculates (460) an acreage (Ai) of an area enclosed by contour i from the contour list. The server system then determines (462) whether a difference between the acreage (Ai) of contour i in the binary image of the test image and the acreage (A) of the anchor contour in the binary image of the standard sample image (e.g., calculated in step 440 of FIG. 4G) is no greater than a predetermined threshold value (e.g., a predetermined threshold ratio d times A:d*A):

$$|A_i - A| \leq d \times A$$

In accordance with a determination that the difference is greater than the predetermined threshold value, the server system increases (467) the counter i by 1 to examine the next pattern contour. In accordance with a determination that the difference is less than or equal to the predetermined threshold value, the server system proceeds to calculate (464) a shape feature Si of the contour i. In some embodiments as discussed herein, the shape feature Si is calculated based on the number of local maximum distances from the center point of the contour i to each point along the contour i (e.g., the number represents the number of apexes of the shape). The server system then determines (466) the closeness between the shape feature Si and the shape feature S of the anchor contour in the binary image of the standard sample image (e.g., determined in step 442 of FIG. 4G). For example, the difference between the shape feature Si and the shape feature S is compared with a predetermined threshold value t to examine whether:

$$|S_i - S| \leq t$$

In accordance with a determination that the difference is less than or equal to t, the server system determines (468) that contour i is the target contour for the anchor (e.g., the contour 418 in FIG. 4B corresponds to the reference mark or the anchor 404 in FIG. 4A). In accordance with a determination that the difference is greater than t, the server system increases (467) the counter i by 1 to examine the next pattern contour.

Proceeding to the third process 470 in FIG. 4I, the server system identifies (472) the target contour 418 from the test image as discussed with reference to FIG. 4H. The server system then determines (474) a minimum enclosing rectangle 408 (FIG. 4C) that encloses the contour 418. The server system determines (476) four sequential points of the rectangle 408 as shown in FIG. 4C. The server system then calculates (478) an affine matrix based on the four points (of rectangle 408) of the test image and the four points (of rectangle 406) of the training sample image as illustrated in FIG. 4C.

Proceeding to the fourth process 480 in FIG. 4J, the server system identifies (482) the target contour 418 from the test image as discussed with reference to FIG. 4H. The server system then determines (484) a center point (e.g., center point 424 of FIG. D) of the target contour 418. The server system then calculates (486) a histogram 429 as shown in FIG. 4F of distances Di(θ) between the center point 424 and each of a set of points on the target contour 418. The server system then selects (488) x adjacent and equally spaced points from the target contour 418 of the test image (e.g., adjacent points are 360/n degrees apart, n≥). The server system selects (490) corresponding x points from the anchor contour of the training sample image, set θ=k*₃. The server system further calculates (492) distances between the x points and the center point 420 of the anchor contour in the training sample image. The server system then compares (494) the histogram 428 (FIG. 4E) of the training sample image and the histogram 429 (FIG. 4F) of the test image to identify the minimal distance (Δθ), and point K on the anchor of the test image that corresponds to the point O (θ=0) on the anchor of the standard sample image.

For example, as shown in FIG. 4F, the x axis represents an angle between (1) a line connecting a point i 426 on the anchor contour and the center point 424 and (2) a horizontal line. The point i 426 is selected to be $$P_{testi} = (P_{texi}, P_{teyi}) \quad (1)$$

The center point 424 is $$CP_{test} = (C_{tex}, C_{tey}) \quad (2)$$

The distance between the point i 422 and the center point 420 is $$D(\theta) = \sqrt{(P_{texi} - C_{tex})^2 + (P_{teyi} - C_{tey})^2}$$

$$\theta = \arctan\frac{(P_{teyi} - C_{tey})}{(P_{texi} - C_{tex})}$$

In some embodiments, there are three steps to find the key points:

Step 1: the system selects n points from the target anchor from the test picture that are adjacent and equally spaced from each other. The angle between two adjacent points is set as ζ. Then the system can get a points list:

$$P_{tj} = (P_{txj}, P_{tyj}) \ (P_{tj} \in P_{train}, j \in [1, n]), \text{ and}$$

$$\theta_j - \theta_{j-1} = \varsigma\left(\theta = \arctan\frac{(P_{teyi} - C_{tey})}{(P_{texi} - C_{tex})}\right) (P_{tj} \in P_{i\ test}, j \in [1, n]),$$

and $\theta_0 = 0$.

Then the system can get n distance values.

Step 2: the system selects n points from the sample image, the angle between adjacent points is the same as ζ. Then the system can get a points list:

$$P_{tj} = (P_{txj}, P_{tyj}) \ (P_{tj} \in P_{test}, j \in [1, n]), \text{ and}$$

$$\theta_j - \theta_{j-1} = \varsigma\left(\theta = \arctan\frac{(P_{teyi} - C_{tey})}{(P_{texi} - C_{tex})}\right) (P_{tj} \in P_{i\ test}, j \in [1, n]),$$

for initiation station, set $\theta_0=0$. Then the system can get n distance values.

Step 3: the system gets the distance function between the above two point lists. Set the function as $$DD_k(j) = \Sigma(D_i(\theta_j) - D_k(\theta_j)),$$

Then set $\theta_0 = k \times \varsigma$, then the system will find the minimal $DD_k(j)$ and the k points in the training sample correspond to the training sample point whose θ=0. In some embodiments, the number of points included in the point lists are reduced to save the calculation time and improve the efficiency of the system. In some other embodiments, one or more limitations can be added to the calculation. For example, if the object can only rotate within a range between −β to β, the rotation angle for anchor detection can also be limited to a range between −β to β, then the system needs only calculate the distance of the points between −β to β, so as to save the processing time and improve efficiency.

Figure 5:
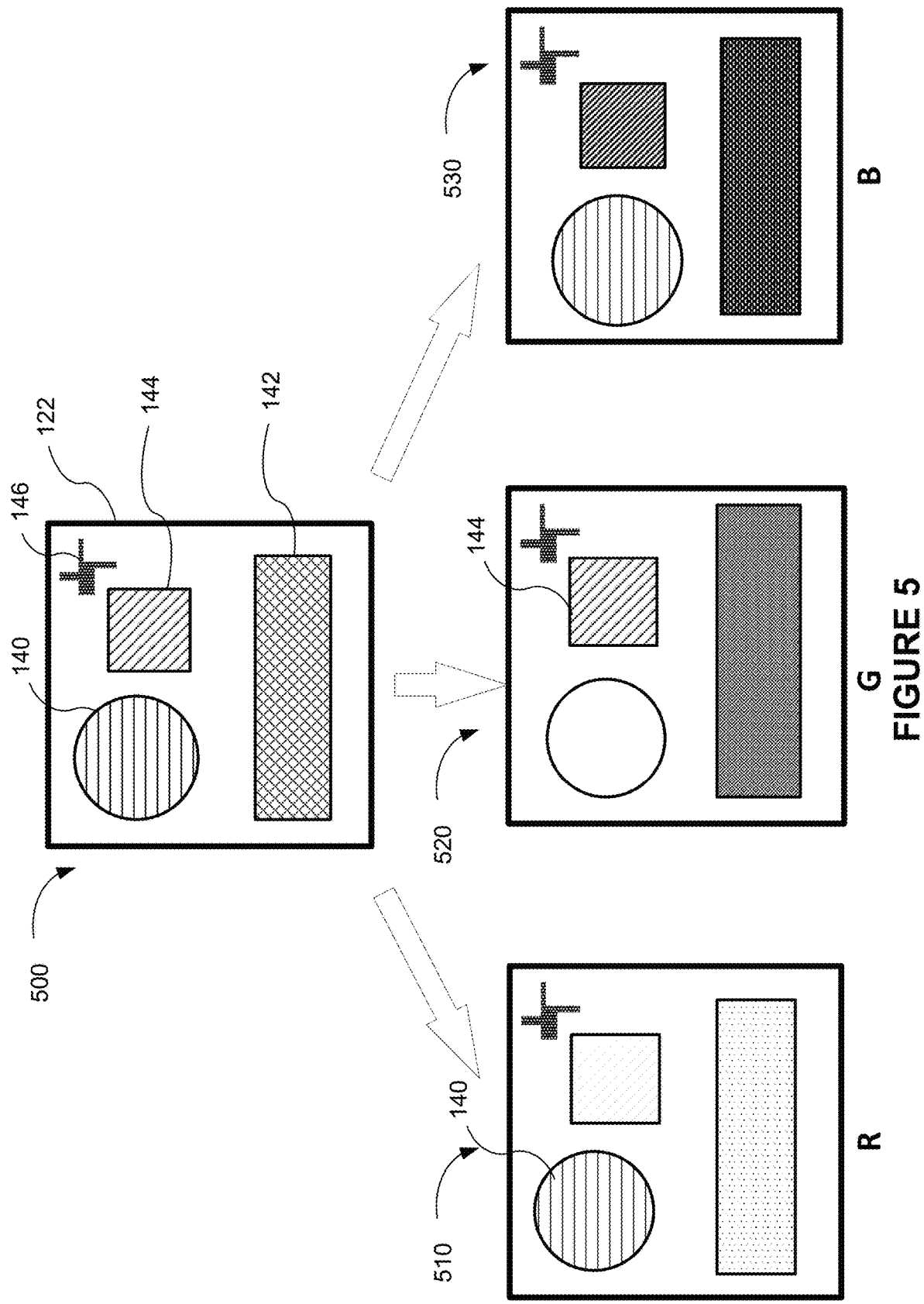
FIG. 5 is an exemplary image of a product including a plurality of information channels, in accordance with some embodiments.

FIG. 5 is an exemplary image 500 of the product 122 including a plurality of information channels 510, 520, and 530, in accordance with some embodiments. In some embodiments, the image 500 is captured by the edge device 104-1, such as a color camera. The image 500 may include a plurality of information channels, such as a red color channel (R), a green color channel (G), and a blue color channel (B). In some embodiments, the image 500 may further include depth information (D) which is captured by a depth camera. In some embodiments, a single-channel image, e.g., R channel image 510, includes a single value for red color at each pixel location of the image. Similarly, G channel image 520 includes a single value for green color at each pixel location, and B channel image 530 includes a single value for blue color at each pixel location. In some embodiments as shown in FIG. 5, for the same image 500, different channel images may present different patterns depending on the original color information of each component. For example, if component 140 is a red cup, then the R channel image 510 contains the most relevant information for performing visual inspection on component 140. On the other hand, if component 144 is a green cable, then the G channel image 520 contains the most relevant information for performing visual inspection on the component 144.

Figure 6A:
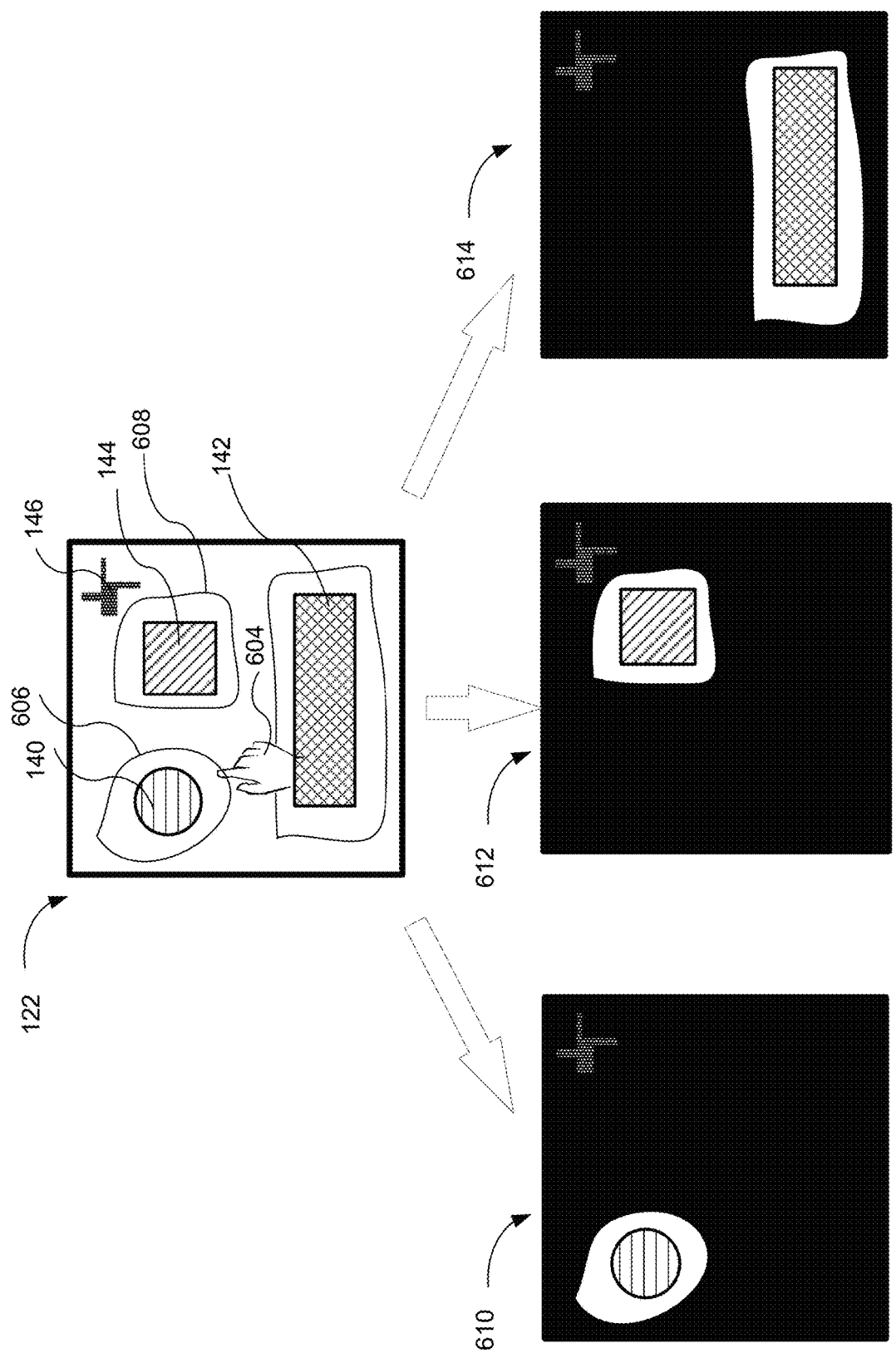
FIG. 6A illustrates a process of preparing one or more masks corresponding to one or more components of a product for visual inspection, in accordance with some embodiments.
Figure 6B:
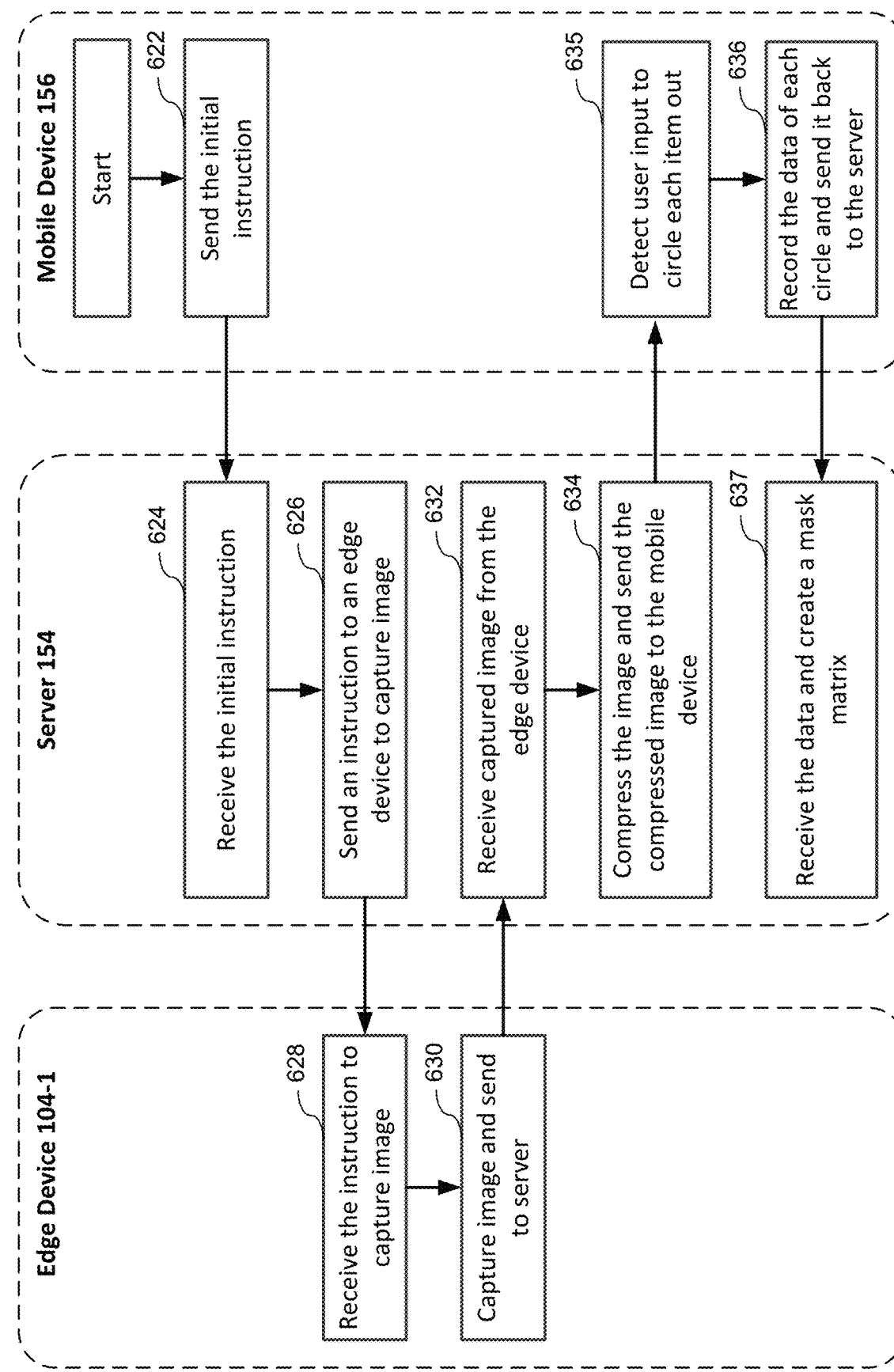
FIG. 6B is a flow diagram illustrating a method of preparing one or more masks corresponding to one or more components of a product for visual inspection, in accordance with some embodiments.

FIG. 6A illustrates a process of preparing one or more masks (e.g., masks 610, 612, and 614) corresponding to one or more components (e.g., objects 140, 144, and 142) of the product 122 for visual inspection, in accordance with some embodiments. FIG. 6B is a flow diagram illustrating a method of preparing one or more masks corresponding to one or more components of a product for visual inspection, in accordance with some embodiments. The method of FIG. 6B are performed by three entities including an edge device (e.g., the camera 104-1), the server system 154, and the mobile device 156. In some embodiments, a user of the mobile device 156 sends (622) a command, e.g., an "initialization" command to initiate the mask preparation process, to the server 154. Upon receiving (624) the command, the server sends (626) an instruction, e.g., a "capturing image" command, to an edge device, such as the camera 104-1, to capture an image. Upon receiving (628) the instruction to capture an image, the edge device 104-1 captures (630) an image and sends the captured image to the server 154. The server receives (632) the captured image from the edge device 104-1, and further compresses (634) the captured image to a low-resolution version to save the bandwidth of network communication between the server 154 and the mobile device 156. The server 154 then sends (634) the compressed image to the mobile device 156. The mobile device 156 displays the image to the user to let the user to circle one or more components (e.g., objects, items, parts, etc.) using respective polygons (e.g., circles, squares, rectangles, etc.). The mobile device detects (635) one or more user inputs for circling one or more components of the product out. The mobile device then records (636) the coordinates of each polygon and sends (636) it to the server 154. The server receives and uses (637) the coordinates of each polygon corresponding to a component circled by the user to make a masking matrix for that user selected component.

Figure 6C:
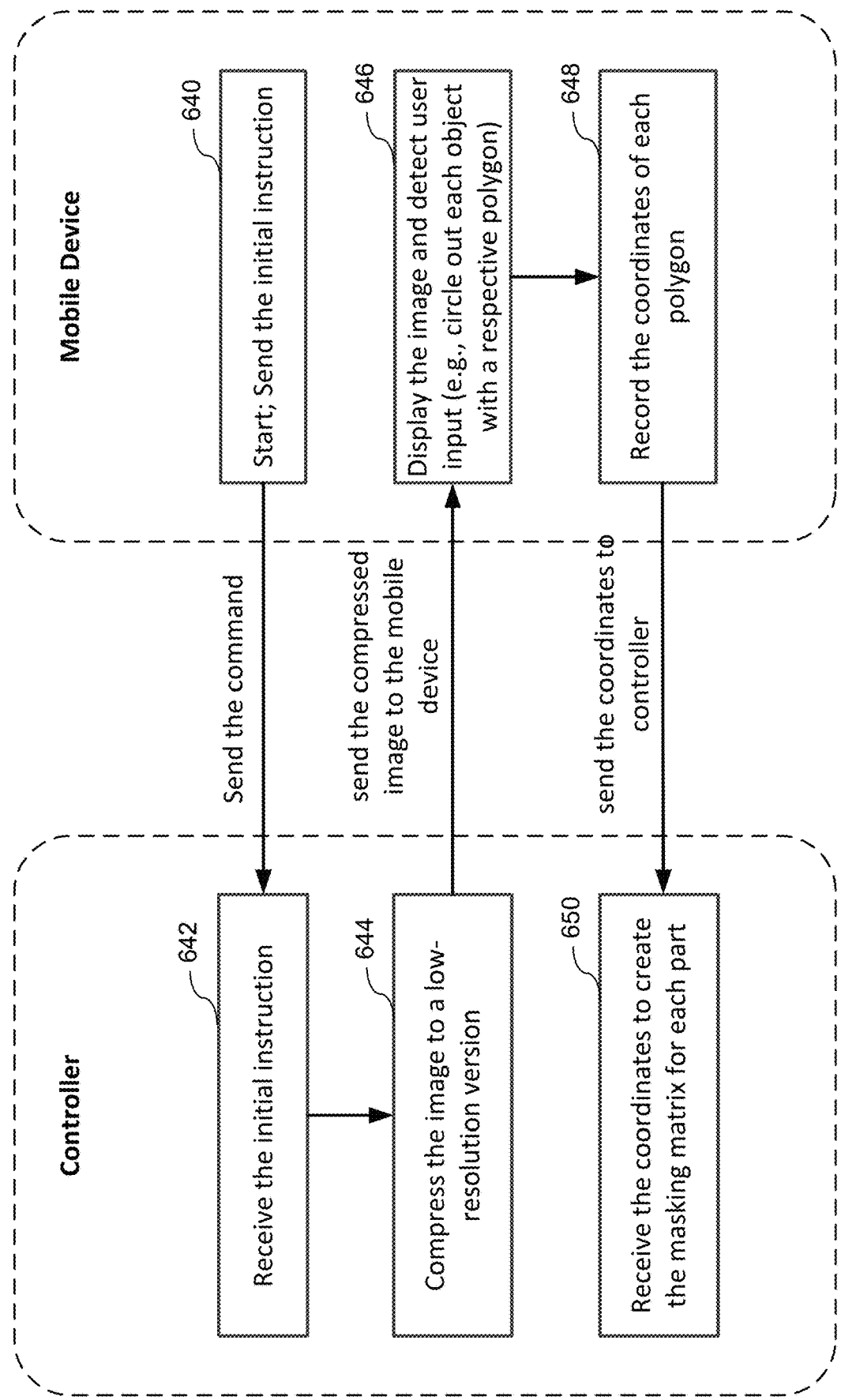
FIG. 6C is a flow diagram illustrating a method of preparing one or more masks corresponding to one or more components of a product for visual inspection, in accordance with some embodiments.

FIG. 6C is a flow diagram illustrating a method of preparing one or more masks corresponding to one or more components of a product for visual inspection, in accordance with some embodiments. The method of FIG. 6C can be performed on a standalone device, e.g., a camera coupled to a controller for performing image processing. The method starts by sending (640) the initial command for capturing an image to the controller using the mobile device. The controller receives (642) the initial instruction, captures an image of the product on the assembly line, and compresses (644) the image into a low-resolution version, and sends the compressed image back to mobile device. The mobile device displays (646) the compressed image, and detects (646) a user input (e.g., the user circles out each object with a respective polygon). The mobile device records (648) the coordinates of each polygon input by the user, and sends it to the controller. The controller receives (650) and uses the coordinates of each polygon corresponding to a component circled by the user to make a masking matrix for that user selected component.

Figure 7A:
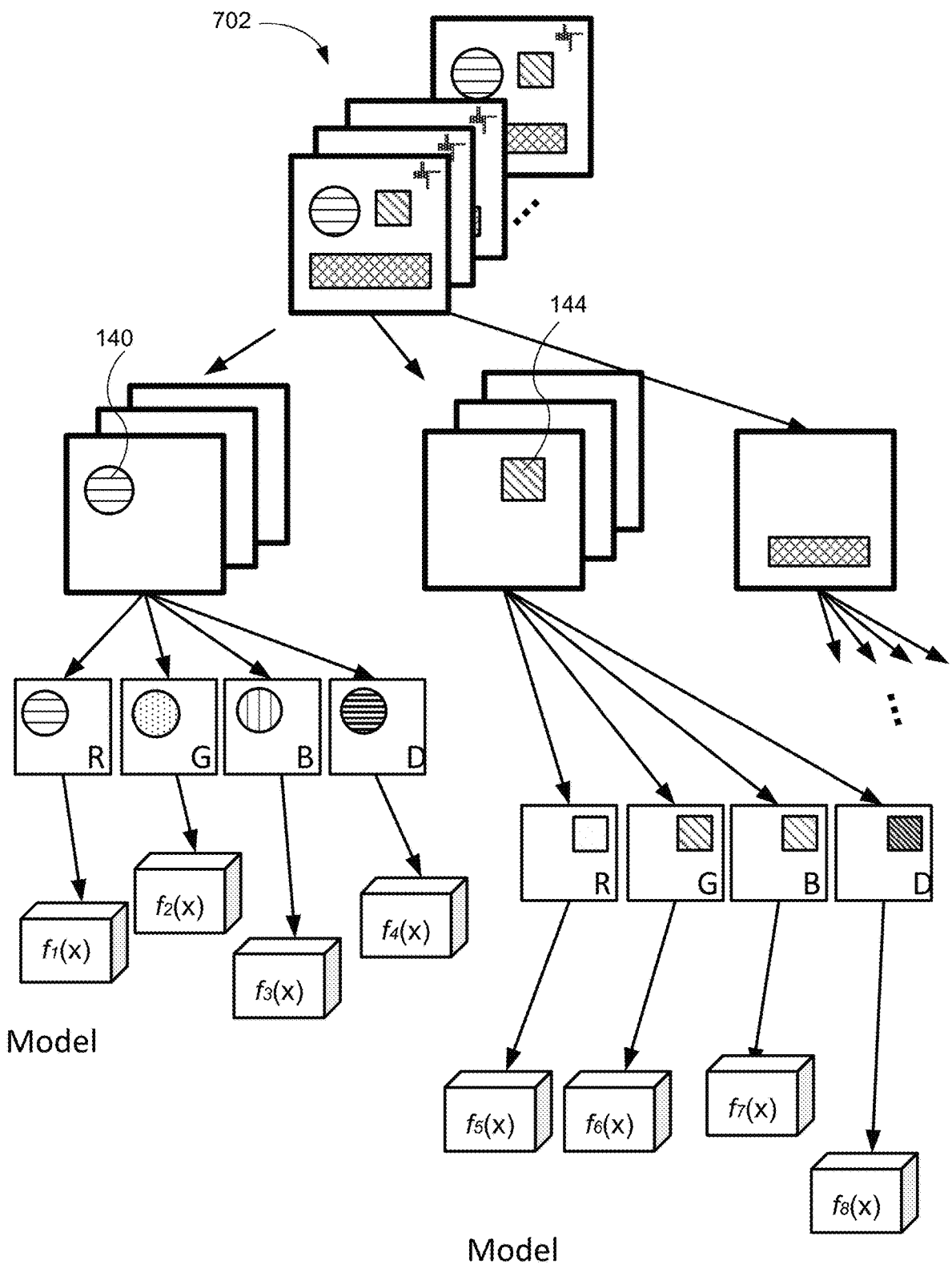
FIG. 7A illustrates a process of training one or more models for one or more components of a product for visual inspection, in accordance with some embodiments.

FIG. 7A illustrates a process of training one or more models for one or more components (e.g., objects 140, 144) of a product for visual inspection, in accordance with some embodiments. In some embodiments, each model includes a plurality of sub-models (e.g., f1($x$)-f2($x$)) for respective information channels (e.g., the R, G, B, and D channels respectively) of the image. In some embodiments, the model training process uses a blueprint of the product showing predetermined respective positions and orientations of the objects within the product. In some embodiments, the model training process uses a set of images captured by the camera 104-1 of the product, and the set of images reflect the standard positions and orientations of the objects within the product.

Figure 7B:
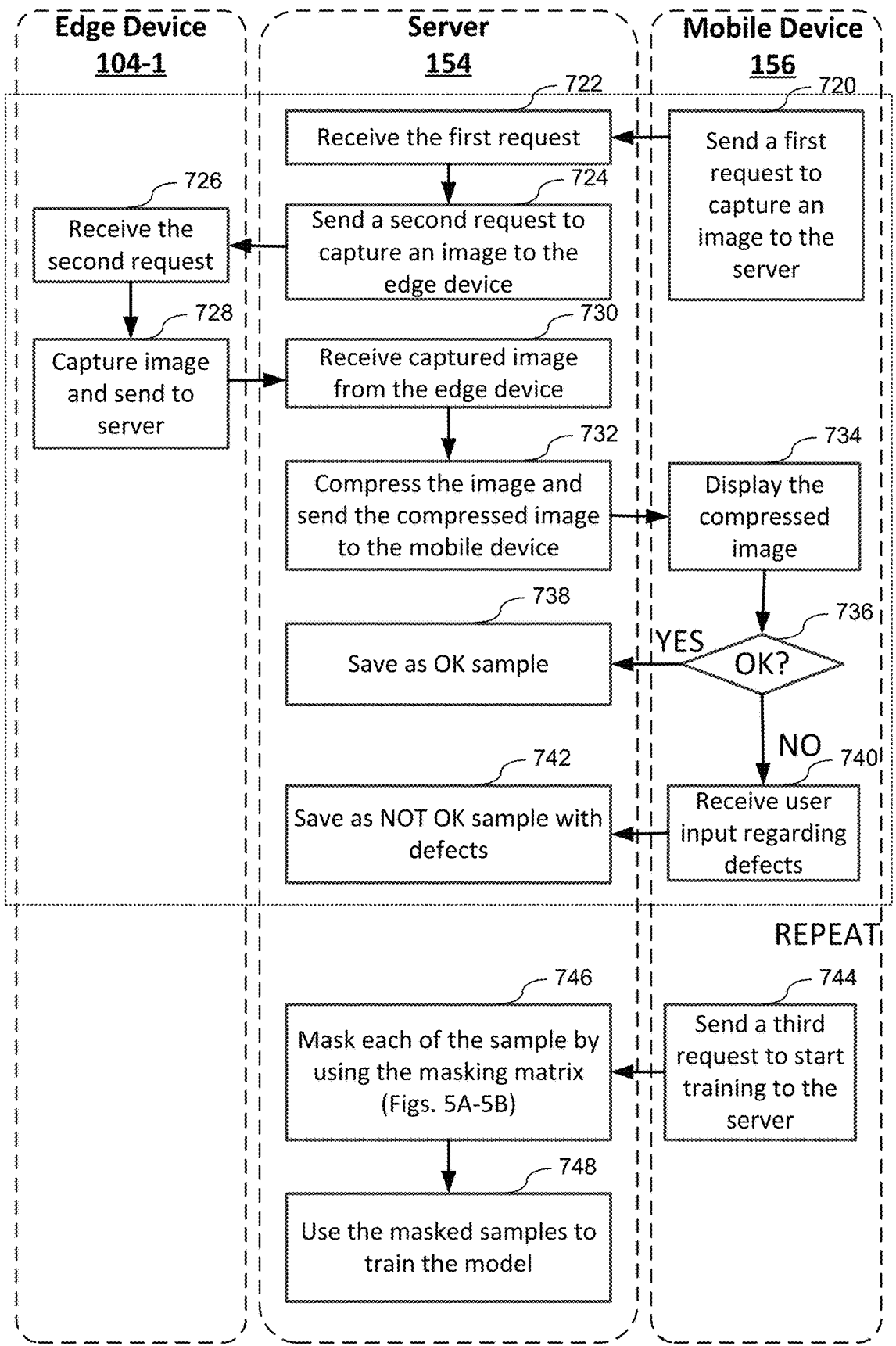
FIG. 7B is a flow diagram illustrating a method of training one or more models for one or more components of a product for visual inspection, in accordance with some embodiments.

FIG. 7B is a flow diagram illustrating a method of training one or more models for one or more components of a product for visual inspection, in accordance with some embodiments. In some embodiments, the method of FIG. 7B is performed by the mobile device 156, the server system 154, and the edge device 104-1. In some embodiments, the user of the mobile device sends (720) a first request, e.g., a command "Training," to the server 154 using the mobile device 156. The first request is associated with an instruction to capture an image by a camera for training. The server 154 receives (722) the command from the mobile device and sends (724) a second request, e.g., a command "capturing an image" to edge device 104-1. The edge device 104-1 receives (726) second request, and captures (728) an image of the product 122 on the assembly line, and sends (728) the captured image to the server 154. The server receives (730) the captured image from the edge device 104-1, and compresses (732) the captured image to a lower-resolution image. The server 154 then sends (732) the compressed image to the mobile device 156. The mobile device displays (734) the compressed image and detects (736) whether a user input received on the displayed image indicates that the captured image is OK. In accordance with a determination that the user input indicates that the image is OK (e.g., the user presses the "upload 'OK' sample" button to indicate that the sample image reflects the standard position and orientation of the objects), the mobile device sends a message to the server 154 and the server saves (738) this image as a OK sample for training. In accordance with a determination that the user indicates that the image is not OK (e.g., the user presses the "upload 'NG' sample" button, and enters the serial number of the missing/defective part.), e.g., missing an object or including a surface defect, the mobile device further receives (740) a user input regarding the detected defects. The mobile device sends a message including the serial number of the missing/defective part to the server and the server marks and saves (742) this image as a "Not Good" sample and the serial number of the missing/defective part. The system repeats the steps 720-742 to gather a plurality of images 702 for training. After the server 154 saves enough amount of training sample images, the mobile device 156 sends (744) a third request, e.g., a command "Train model," to start training to the server 154. The server applies (746) the masks 610, 612, and 614 to each training sample image, to obtain masked image for each component using the masking matrix of the corresponding component. In some embodiments, the server uses (748) machine learning/deep learning method to train the model for each component using the masked images for the corresponding component.

Figure 7C:
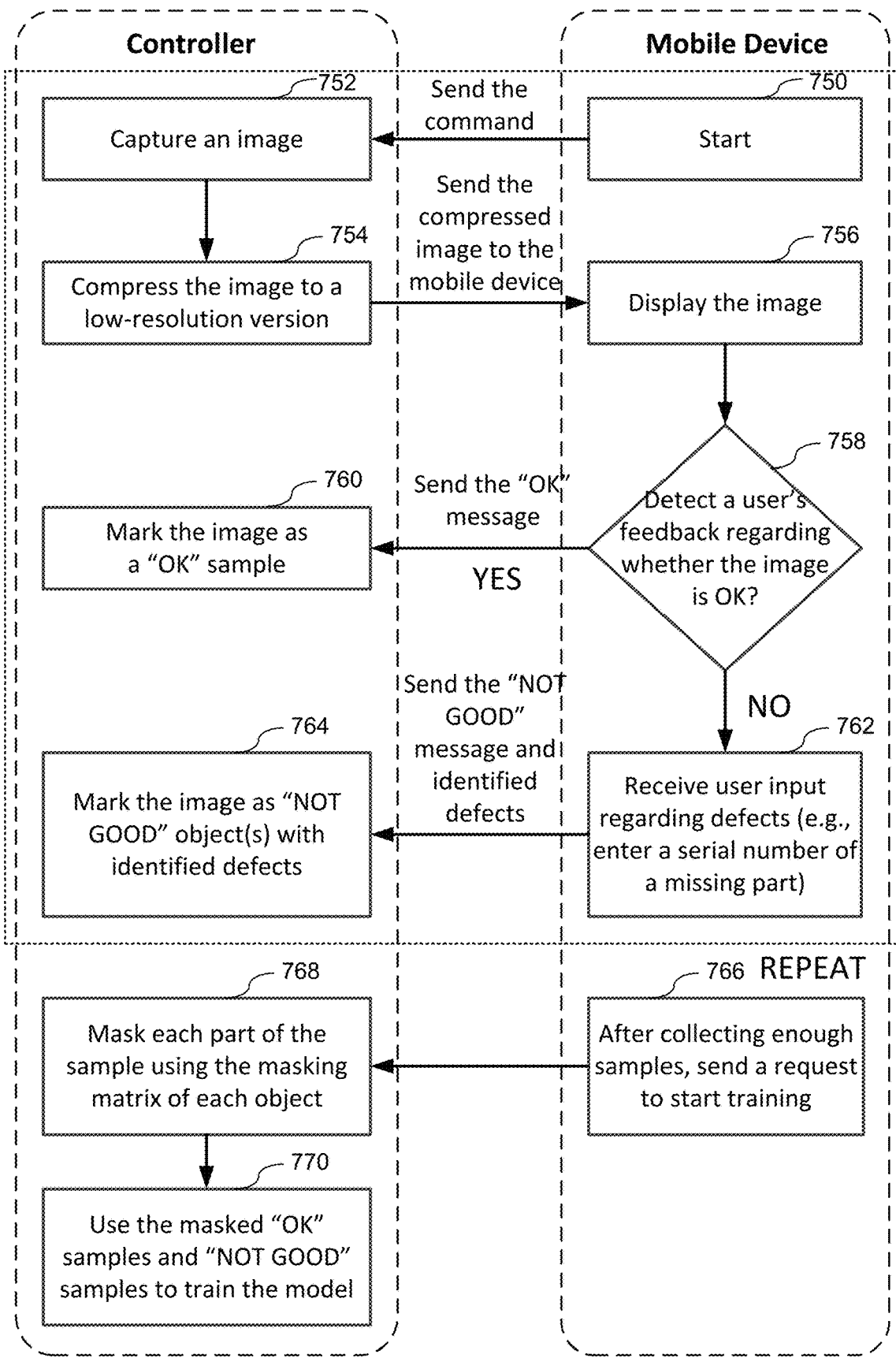
FIG. 7C is a flow diagram illustrating a method of training one or more models for one or more components of a product for visual inspection, in accordance with some embodiments.

FIG. 7C is a flow diagram illustrating a method of training one or more models for one or more components of a product for visual inspection, in accordance with some embodiments. The method of FIG. 7C can be performed on a standalone device, e.g., a camera coupled to a controller for performing image processing. The mobile device sends (750) a command to capture an image to controller. The controller controls (752) the camera to capture an image and compresses (754) the captured image into a low-resolution version and send the compressed image back to mobile device. The mobile device displays (756) the image to the user and detects (758) a user's feedback regarding whether the image is OK. If the user indicates that it is a "OK" sample, the mobile device sends the "OK" sign to the controller. The controller marks (760) the image as a "OK" sample. If it is a "NG" (not good) sample, the mobile device receives (762) the user input regarding the defects (e.g., entering a serial number of a missing/defective part). The mobile device sends the "NG" message and the serial number to the controller. The controller marks (764) the image as "NG" sample with the serial number of the identified defective part. Steps 750-764 are repeated to collect enough "OK" and "NG" samples. When enough samples are collected, the mobile device sends (766) a command "Training" to the controller to start training. The controller masks (768) each part of the sample by using the masking matrix corresponding to each part. The controller uses (770) the masked "OK" samples and "NG" samples to train the models.

Figure 8A:
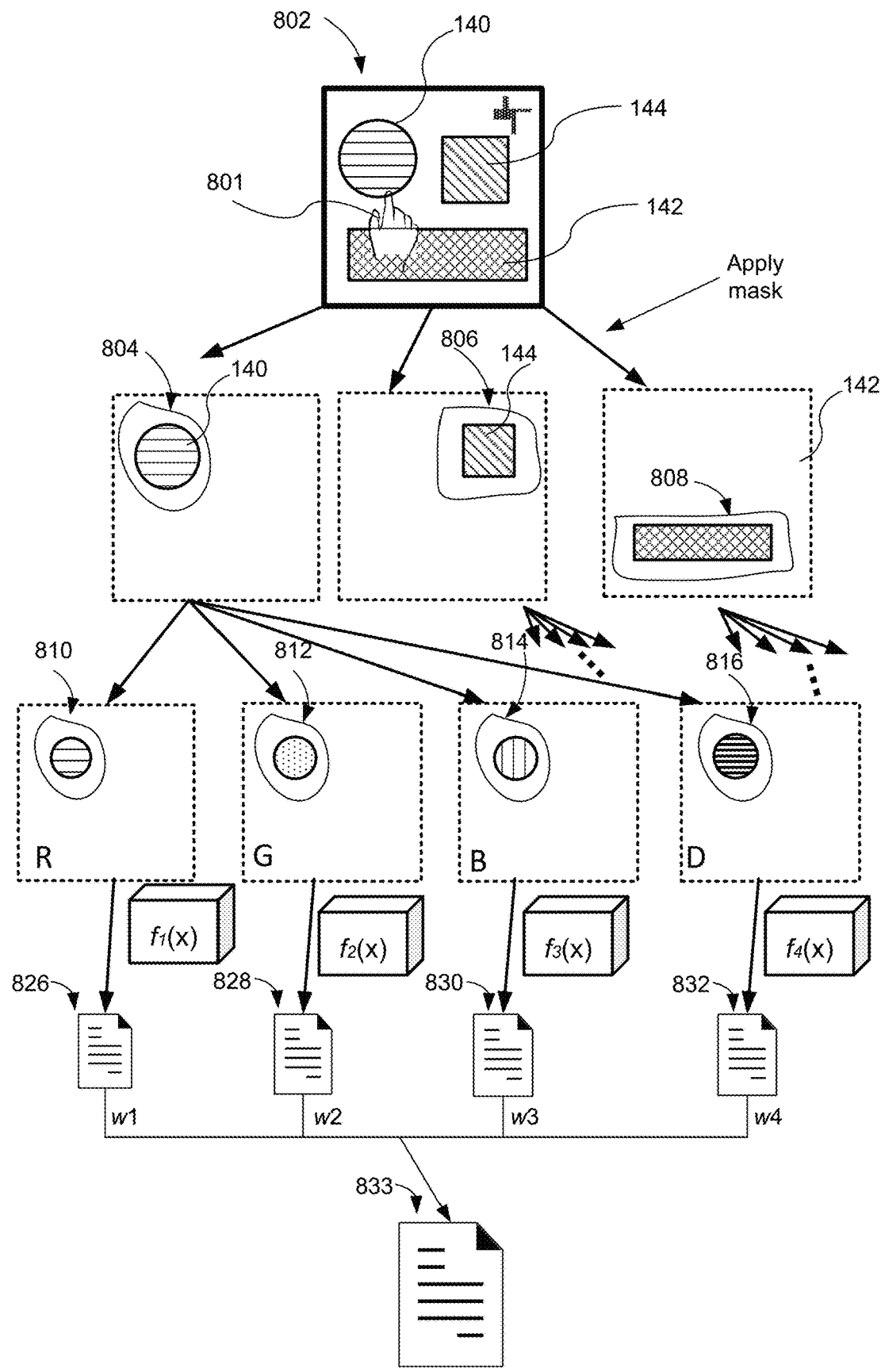
FIGS. 8A-8B illustrate a process of performing product inspection using models, in accordance with some embodiments.
Figure 8B:
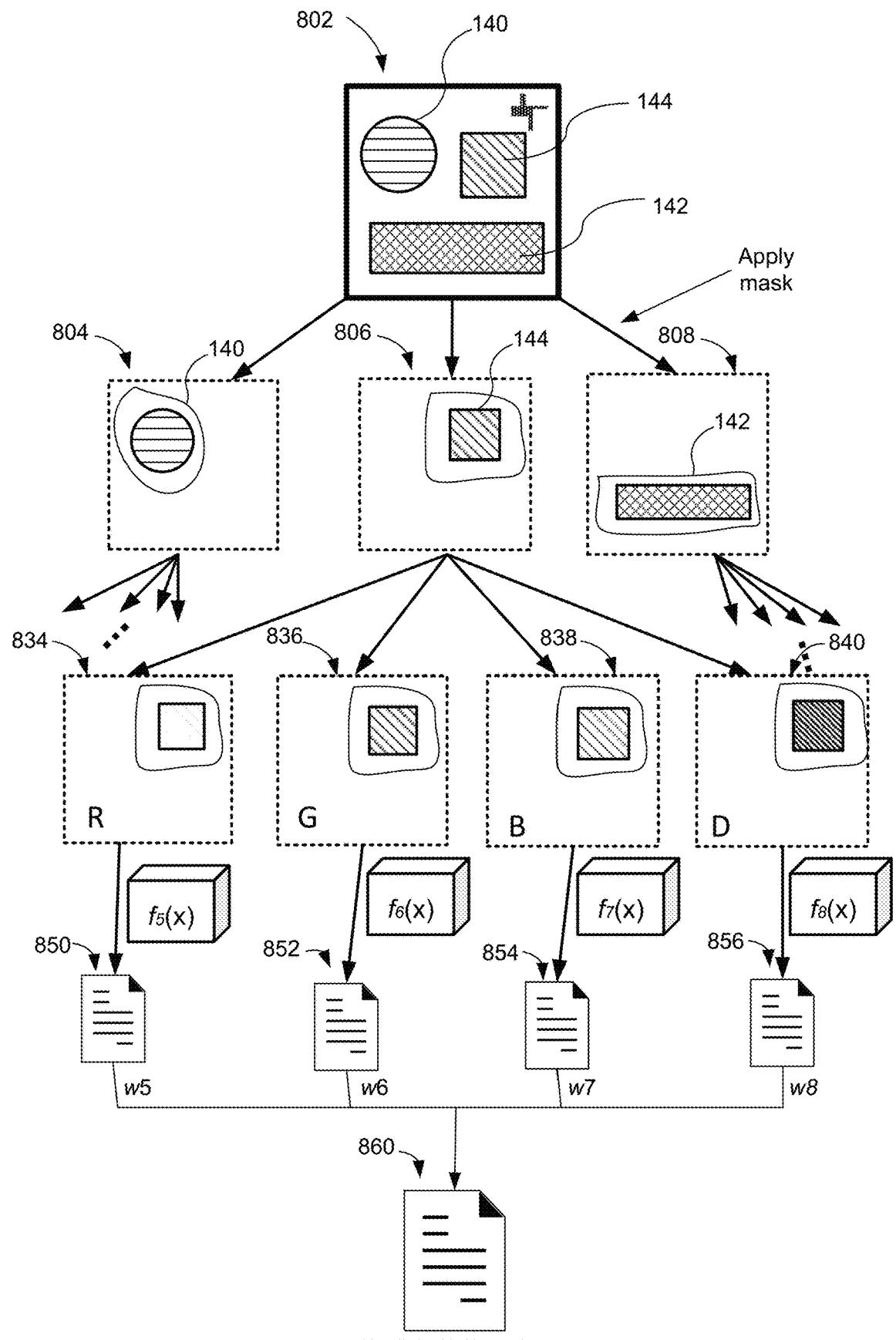

FIGS. 8A-8B illustrate a process of performing product inspection using models obtained from the process as discussed with reference to FIGS. 7A-7C, in accordance with some embodiments. In some embodiments as shown in FIG. 8A, a test image 802 captured by the camera 104-1 is first separated into different sub-portions 804, 806, and 808, corresponding to respective objects 140, 144, and 142 of the product. In some embodiments, the sub-portions are selected by user inputs 801 received on the test image 802 displayed to the user. Alternatively, the system can perform image recognition to automatically identify the respective sub-portions. In some embodiments, a plurality of information channels for each sub-portion (e.g., information channels 810, 812, 814, and 816) are obtained. For example, the information channels 810, 812, 814, and 816 correspond to R, G, B, D channels respectively. For each sub-portion, a corresponding sub-model obtained from the process of FIGS. 7A-7C are used to perform the inspection. For example, the sub-model f1(*s*) is applied to the R channel of the sub-portion 810 to obtain a testing result 826 indicating a possibility that object 140 is defective or missing (would use different sub-models corresponding to the likelihood of the object 140 being defective or missing respectively). After obtaining the testing results 826, 828, 830, and 832 for each information channel of the sub-portion 810, respective weights w1, w2, w3, and w4 are assigned to the respective testing results. The respective weights can be assigned by the user based on user's experience, or automatically by the system based on previous testing results of the same sub-portion. Then the final result 833 can be obtained. Similarly, as shown in FIG. 8B, the information channels 834, 836, 838, and 840 correspond to R, G, B, D channels of the sub-portion 144 can be obtained respectively. The respective sub-models from the process of FIGS. 7A-7C are used to perform the inspection of the sub-portion 144 to obtain the testing results 850, 852, 854, and 856. Respective weights w5, w6, w7, and w8 are assigned to the respective testing results to calculate the final result 860.

Figure 8C:
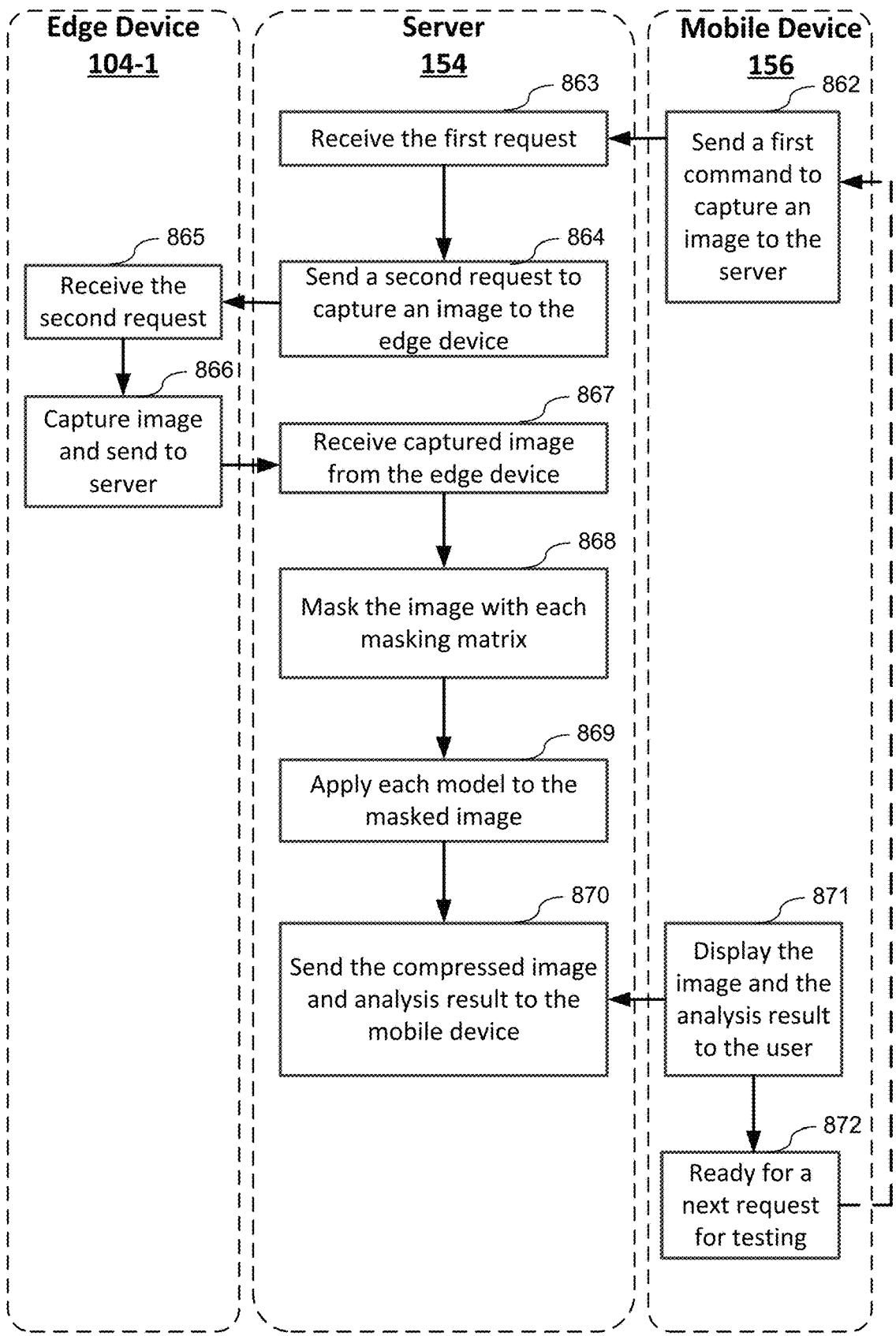
FIG. 8C is a flow diagram illustrating a method of performing product inspection using models, in accordance with some embodiments.

FIG. 8C is a flow diagram illustrating a method of performing product inspection using models, in accordance with some embodiments. In some embodiments, the method of FIG. 8C is performed by the mobile device 156, the server system 154, and the edge device 104-1. In some embodiments, the user using the mobile device 156 to send (862) a command "detection" to the server 154 to capture an image. The server 154 receives (863) the command and sends (864) a second request of "capturing image" to the edge device 104-1. The edge device receives (865) the command, captures (866) an image and sends (867) it to the server. The server receives (867) the captured image and masks (868) the image by the masking matrix of each component. The server then applies (869) each model to the masked image, by letting the masked image pass the corresponding model and calculate the result. The server sends (870) the compressed image and the detecting result to the mobile device. The mobile device displays (870) the image and the detecting result to user. The mobile device then notifies (872) the user that the system is ready for a next request for testing, and proceeds back to step 862.

Figure 8D:
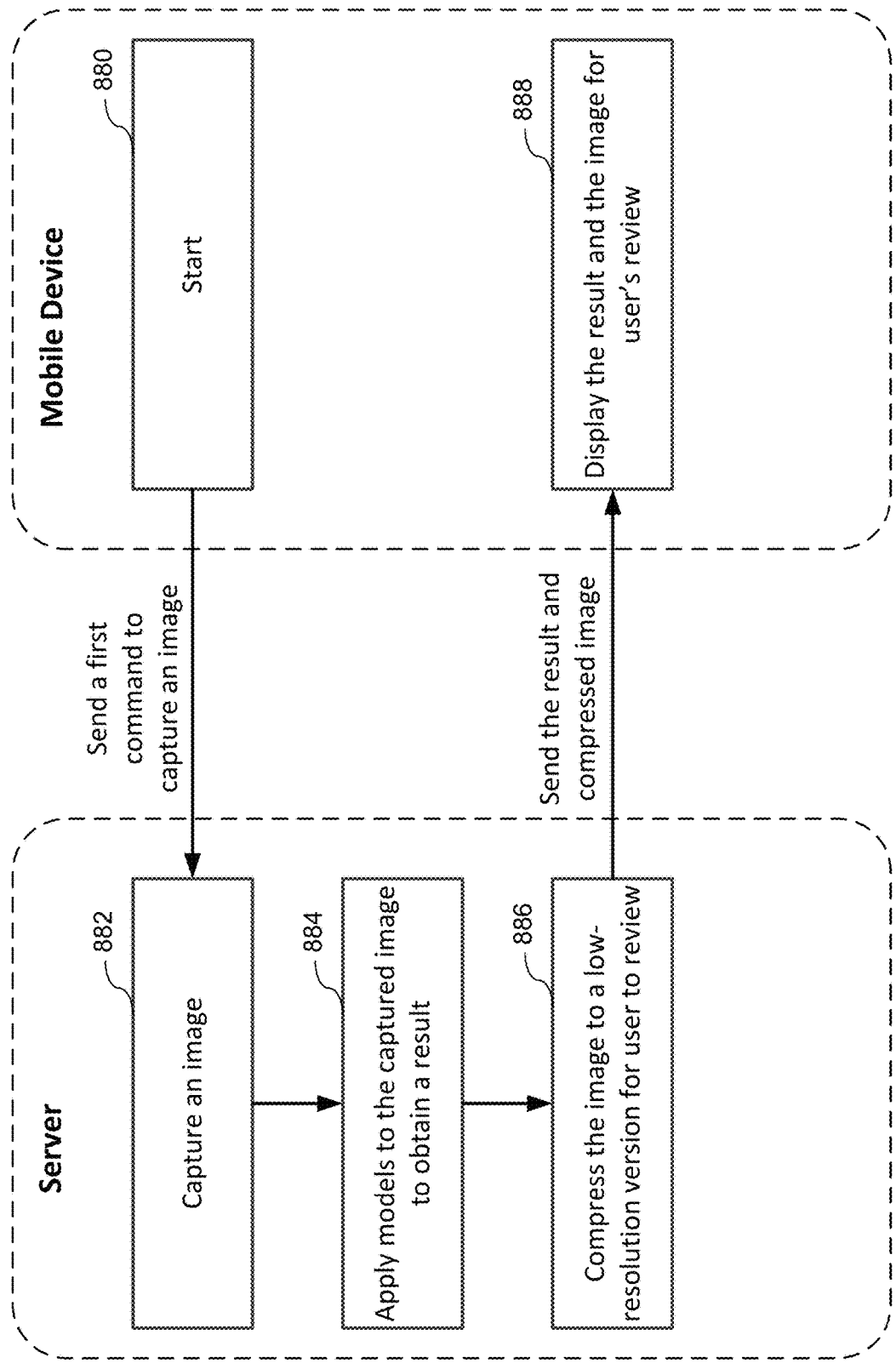
FIG. 8D is a flow diagram illustrating a method of performing product inspection using models, in accordance with some embodiments.

FIG. 8D is a flow diagram illustrating a method of performing product inspection using models, in accordance with some embodiments. The method of FIG. 8D can be performed on a standalone device, e.g., a camera coupled to a controller for performing image processing. The mobile device sends a user command to capture an image to the controller. the Controller captures (882) one image. The controller applies (884) corresponding models to the capture image, by letting the image pass each trained model and calculate the result based on each of the weight. The controller compresses (886) the image to a low-resolution version, and sends the detection result and the compressed image to the mobile device for user to review. The mobile device displays (888) the result and the image. The system repeats the steps 880 to 888 for more inspection processes.

Figure 9A:
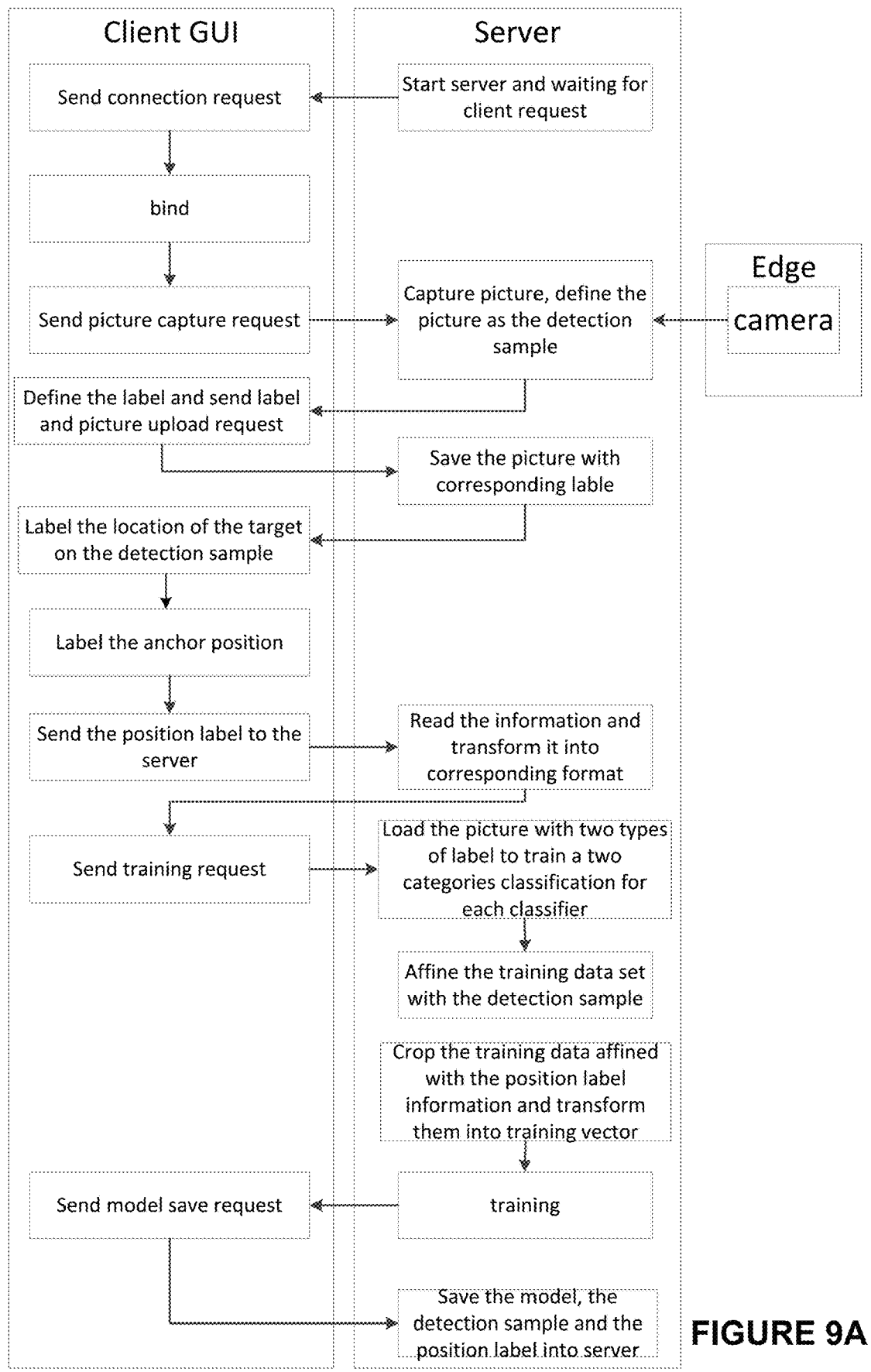
FIG. 9A is a flow diagram illustrating a method of training one or more models for performing visual inspection of a product, in accordance with some embodiments.

FIG. 9A is a flow diagram illustrating a method of training one or more models for performing visual inspection of a product, in accordance with some embodiments. For the training process shown in FIG. 9A, all the operating instructions are given by the user on the client end (e.g., the mobile device 156), and then be transformed to the server end (e.g., the server 154). The training process includes setting communication information for the server and the GUI, and then connect them together. For example, the client sends a connection request, and in response to the connection request, the server and the client are connected. The client then sends a request to capture an image. The server instructs the camera to capture an image in response to this request, and designates the captured image as a training sample. The server sends the captured image to the client for display. The client displays the image to the user, and the user labels the location of the target component on the image. The user may further label the anchor position (e.g., the position of the reference marker 146). The client sends the position label information to the server. The server formats the label information and stores such information at the server. In some embodiments, the server captures the image and the label data for both the standard product and the defective product, and the defective product may include different types of defects. For different types of defects, different labels are assigned. A plurality of training samples are used for each type of defect.

In response to receiving a training request from the client, the server loads the plurality of pictures with two types of labels respectively to train a two categories classification for each classifier. That is, the model under training can be used for identifying whether a testing sample is defective or without any defect. In some embodiments, one training sample is selected for position detection, and the image is segmented into the position for the defect area and the detect anchor. The server trains classification model with all the data collected above, and each time the system will load only one type of defect pictures, and then the system will train a 2-class classifier which can classify whether the target area is perfect or not. In each training process, the system will affine the picture first, then crop the target defect area from the picture, and transform it into vector to feed into the model. After the training process, the number of the 2-class classifier would be as same as the types of the defects. In some embodiments, the system can also be applied with one-class classifier for each kinds of defect. After the training process, the models for position detection and classification are saved at the server.

Figure 9B:
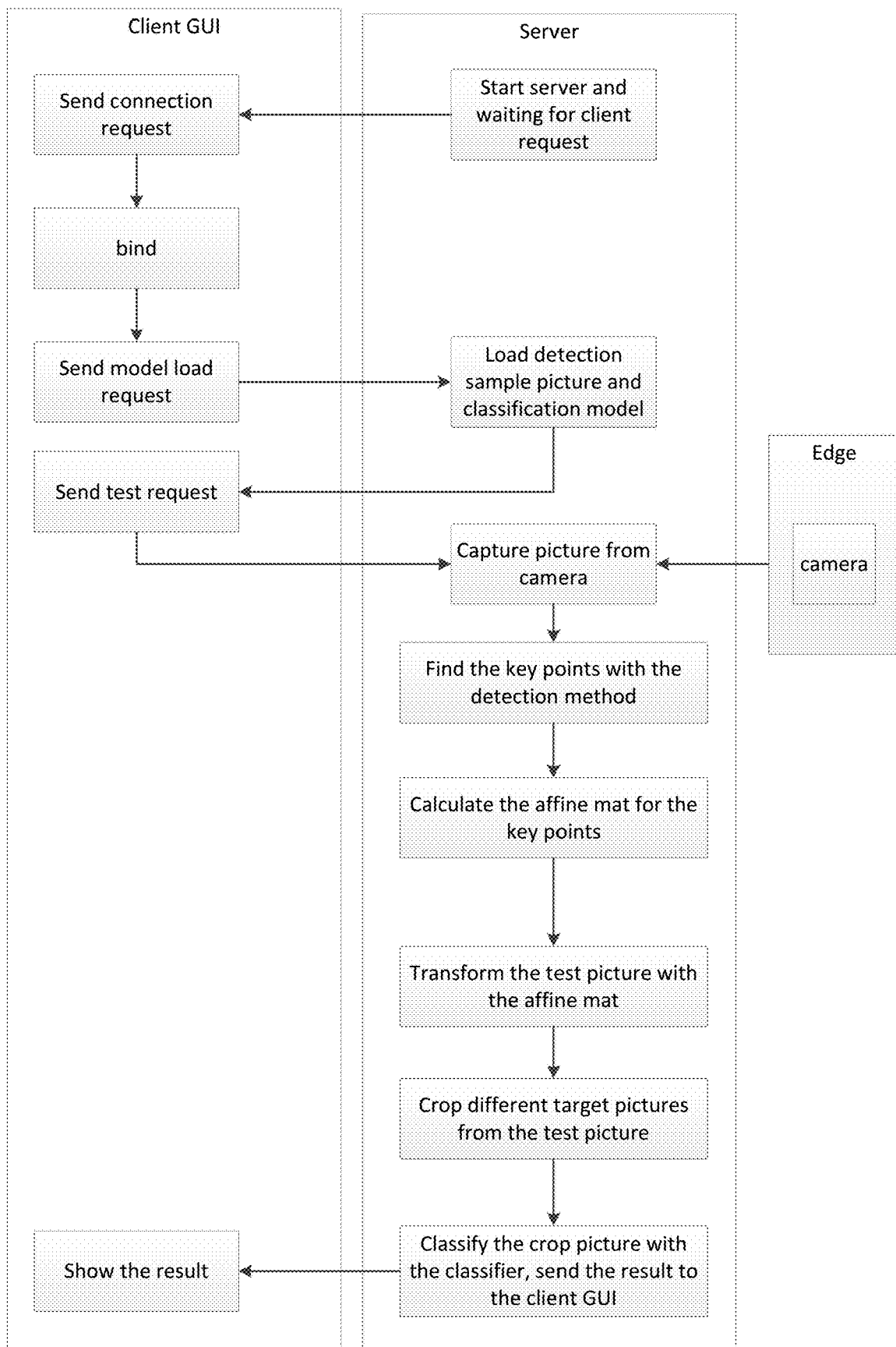
FIG. 9B is a flow diagram illustrating a method of performing product inspection using models, in accordance with some embodiments.

FIG. 9B is a flow diagram illustrating a method of performing product inspection using models, in accordance with some embodiments. The inspection process includes setting communication information for the server and the GUI, and then connect them together. For example, the client sends a connection request, and in response to the connection request, the server and the client are connected. The client then sends a request to the server to load the position detection and classification model. In response, the server loads the detection sample picture and classification model. The client sends a request to perform inspection. The server instructs the camera to capture a test picture for inspection. The server then finds the key points with the detection method, calculates the affine matrix, and transforms the test image with the affine matrix (e.g., to obtain a standardized image). The server also crops the target defect areas from the captured image, and transforms it into input vector for the classification model. The server classifies the cropped image with vector with corresponding classifier. Then the server sends the result to the client for display, and the user can review the result and provide feedbacks on the GUI of the client device.

Figure 10:
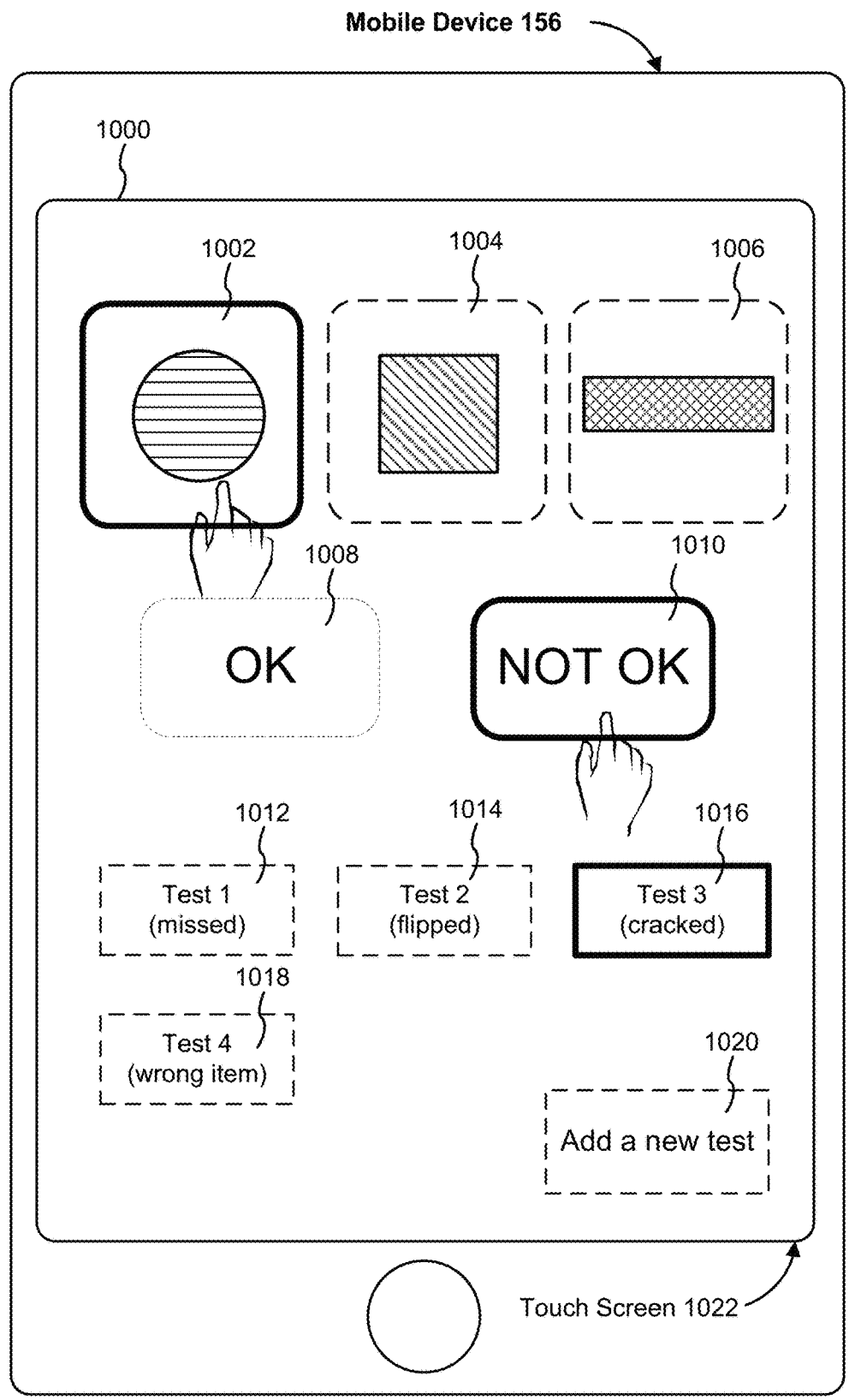
FIG. 10 is an example user interface for a user to interact with training models and performing inspection of a product using a mobile device with a touch screen, in accordance with some embodiments.

FIG. 10 is an example user interface 1000 for a user to interact with training models and performing inspection of a product using a mobile device (e.g., the mobile device 156, FIG. 1B) with a touch screen 1022, in accordance with some embodiments. In some embodiments as discussed in the present disclosure, the user can user the mobile device to provide user feedbacks to each training image captured by the camera 104-1, and provide user instruction training respective models for the components (e.g., parts, objects, sub-portions, etc.). Furthermore, the user can provide instruction for training models (e.g., 2-classifier models) for each type of defect related to each component of the product. In some embodiments, after initiating the training process, the camera 104-1 captures one or more training images (e.g., training images 702, FIG. 7A). The mobile device then displays each training image on the user interface 1000. In some embodiments, the user interface 1000 includes a plurality of icons 1002, 1004, and 1006 corresponding to the components, e.g., objects 140, 144, and 142, of the product. For example, when user selects the icon 1002, the mobile device 156 sends an instruction to the server to initiate training of a model for the corresponding component 140. The user may then provide inputs regarding whether the corresponding component in the currently displayed training image is OK or not OK. If the user selects the OK button 1008, the user sends a message to the server indicating that the object 140 as shown in the current training image is without defect. On the other hand, if the user selects the NOT OK button 1010, the user sends a message to the server indicating that the object 140 in the current training image is defective.

In some embodiments during an inspection process, the mobile device displays a testing image captured by the camera, and the user can select a certain component of the product for testing. The user can further choose to inspect the selected component by a certain type of defect. For example, the user may select to inspect object 140 of the product by pressing the button 1002. The user then selects a button 1016 corresponding to a test of whether the selected component has a crack. As shown in FIG. 10, the system can also test for other types of defects, such as whether the selected component is present or missing 1012, whether the selected component is flipped 1014, whether the selected component is a wrong item 1018. In some embodiments after receiving the result of the current test (e.g., test 3 for cracks), the UI can display a button 1020 for the user to choose to add a new test for a new type of defect, such as "rotated."

Figure 11A:
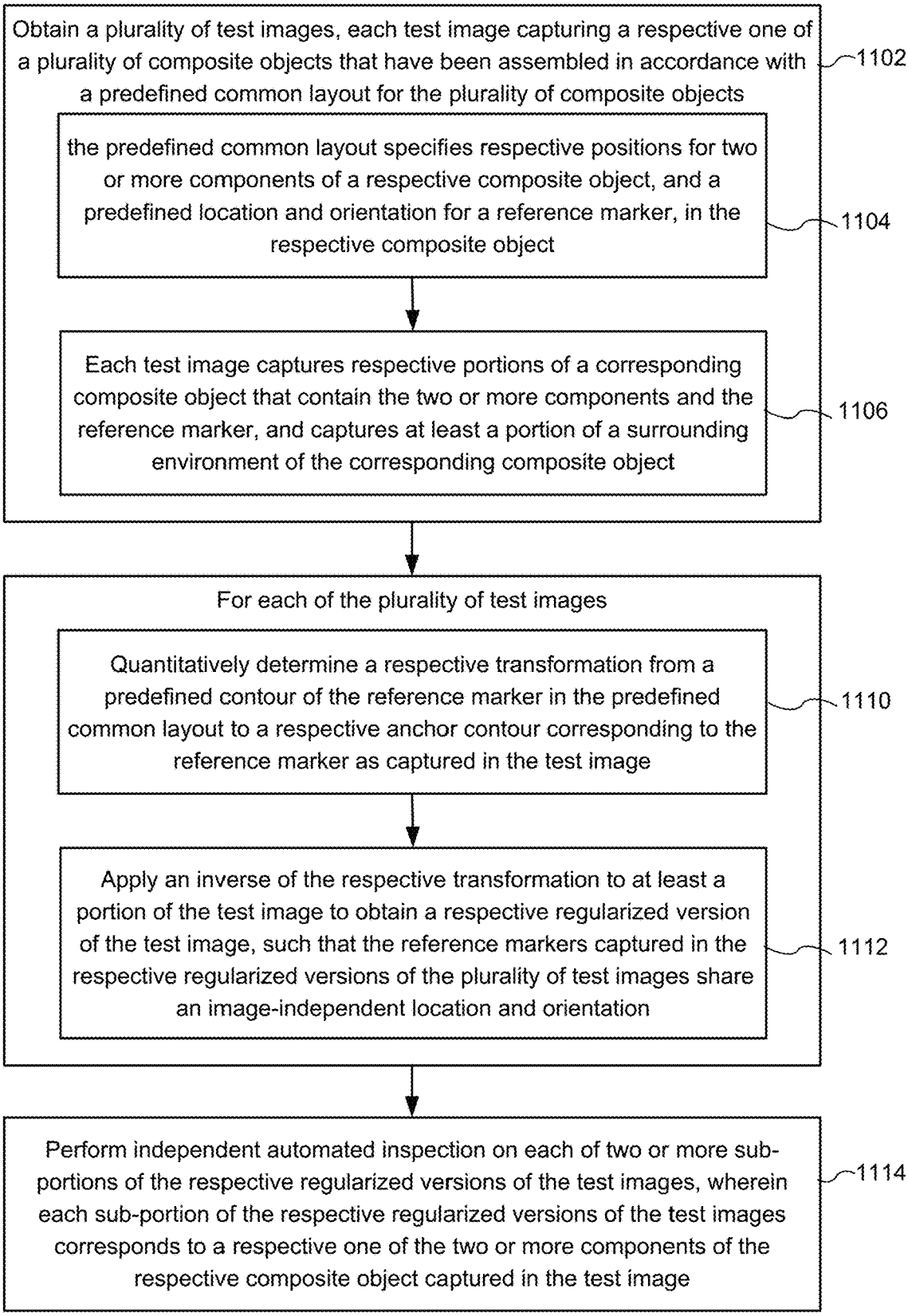
FIG. 11A is a flow diagram illustrating a method of performing automated object inspection on an assembly line, in accordance with some embodiments.

FIG. 11A is a flow diagram illustrating a method 1100 of performing an automated object inspection on an assembly line, in accordance with some embodiments. In some embodiments, the steps of the method 1100 are performed by a server system (e.g., server system 152, FIG. 1B; server system 200, FIG. 2) that serves one or more assembly lines or quality assurance stations. In some other embodiments, the steps of method 1100 are performed by a mobile device (e.g., mobile device 156, FIG. 1B) that is carried by mobile quality assurance personnel. In some other embodiments, the steps of method 1100 are performed by one or more edge devices (e.g., edge devices 104-1, 104-2, . . . 104-n, FIGS. 1A-1B) located at a product assembly line or quality assurance station. In some embodiments, the steps of the method 1100 may be performed by any combination of one or more edge devices, the server system, and the mobile device.

In some embodiments, the edge device 104 includes a camera (e.g., a color camera, a black/white camera, an infrared camera) for capturing images of assembled products or accessories. In some embodiments, the edge devices include various other types of sensors (e.g., weight sensors, touch-sensors, vibration sensors, sound sensors, haptic sensors, temperature sensors, light sensors, movement sensors, etc.) for collecting information about the state of the assembled products and assembly lines. In some embodiments, the edge devices are positioned at fixed locations around the assembly lines or inspection stations. In some embodiments, the edge devices are actuated and positioned by one or more robotic arms around the assembly lines or inspection stations. Method 1100 of FIG. 11A corresponds to instructions stored in a computer memory or computer readable storage medium (e.g., memory 206 of the server system 200, FIG. 2).

In performing the method 1100, the server system obtains (1102) a plurality of test images (e.g., including a test image as shown in FIG. 4A) that are captured by an edge device (e.g., a camera 104, FIG. 1A) located over an assembly line (e.g., the assembly line 100, FIG. 1A) or a quality assurance station. In some embodiments, each test image captures a respective one of a plurality of composite objects. In some embodiments, the respective composite object (e.g., the product 122, FIG. 1A) corresponds to a multi-component product. In some embodiments, the respective composite object corresponds to an accessory pack including multiple objects (e.g., the accessory pack 122 including multiple objects 140, 142, and 144, FIG. 1A) that have been assembled in accordance with a predefined common layout. In some embodiments, the common layout is a blueprint of the multi-component product or the accessary pack. Alternatively, the common layout is an image captured by the camera located over the assembly line of a standard example of the multi-component product or the accessary pack placed at a standard location (e.g., upright and squarely aligned in the center of the table) on the assembly line or quality assurance station for the plurality of composite objects.

The predefined common layout specifies (1104) respective positions for multiple components of a respective composite object, and a predefined location and orientation for a reference marker (e.g., reference marker 146, FIG. 1A) in the respective composite object. In some embodiments, a composite object is a product including multiple parts that are connected to one another in accordance with a predefined design. For example, a composite object includes an electric fan including a head coupled to a platform. In another example, a composite object includes a refrigerator with crisper boxes and wire racks inside. In some embodiments, the predefined common layout specifies respective positions for various accessories (e.g., electric cables, battery pack, instruction manual, a tool kit, etc.) that are packed in various compartments of the accessory box (e.g., the accessary pack 122, FIG. 1A). In some embodiments, the reference marker is a specially designed printed mark, hole, or protrusion, that is designed to have a fixed location and orientation on the product or the accessary box, such that the orientation and lateral position of the product or the accessary box can be deduced accurately once the location and orientation of the reference marker is determined. In some embodiments, for each test image, the orientation and lateral position of the reference marker can be determined based on image processing and object recognition techniques (e.g., discussed with reference to FIGS. 4A-4J). In some embodiments, the reference marker has an asymmetrical shape such that the reference marker shows distinct and unique patterns in various orientations.

Each test image captures (1106) respective portions of a corresponding composite object that contains the two or more components and the reference marker, and captures at least a portion of a surrounding environment of the corresponding composite object. For example, each time when a newly assembled product or accessory pack is placed on a table along the assembly line or the quality assurance station, the camera (e.g., the camera 104-1, FIG. 1A) placed at a fixed location or controlled by a robotic arm captures an image of the product or accessory pack from above. In an actual production scenario, the location and orientation of the product or the accessary pack are not always exactly the same. For example, the products or the accessary packs may be dropped and/or pushed into the camera view after they are assembled, and they may be of slightly different lateral positions and rotational angles on the table, even if they are all laid flat on the table. As discussed with reference to FIGS. 3B-3E, in some embodiments, the purposes of the inspection via the images include inspection for defects (e.g., visual defects or surface defects) including, but not limited to, scratches, abrasion, corrosion, debris, cracks, blemishes, broken off pieces. In some embodiments, the purposes of the inspection via the images include inspection for missing parts, such as missing items in certain holes of the accessary box, missing a screw in a screw hole. In some embodiments, the purposes of the inspection via the images include inspection for inaccurate positioning of the parts, for example, when wire rack of the refrigerator is not properly inserted into the sliding track, or when electric cable and battery pack are swapped in their respective compartments in the accessary box.

The server system further processes each of the plurality of test images as discussed in the following processes. In some embodiments, the processing of the images can be performed serially as each product or each accessory pack is placed on the inspection table along the assembly line and a picture of the product or the accessory pack is taken. In some embodiments, the images from multiple product lines may be processed in parallel.

For each of the plurality of test images, the server system quantitatively determines (1110) a respective transformation from a predefined contour of the reference marker in the predefined common layout to a respective anchor contour corresponding to the reference marker as captured in the test image. In some embodiments, the predefined contour of the reference marker is specified in a blueprint of the product or the accessary box design. In other embodiments, the predefined contour of the reference marker is obtained based on a description of the reference marker that is extracted based on machine learning from a plurality of training images each of which includes the reference marker on sample composite products or sample accessory packs. In some embodiments, the respective anchor contour is extracted and recognized from the captured test image based on image processing techniques described herein.

In some embodiments, quantitatively determining a respective transformation from the predefined contour of the reference marker in the predefined common layout to the respective anchor contour corresponding to the reference marker as captured in a test image includes: quantitatively determining a translational offset and a rotational angle between the reference marker in the predefined common layout and the reference marker in the captured test image. In some embodiments, the transformation is described as a mathematical transformation (e.g., an affine matrix) within a fixed external coordinate system (e.g., a 2-dimensional coordinate system with an origin at the center of the reference mark in the predefined common layout, e.g., as discussed with reference to FIGS. 4C-4D.

Continuing to step 1112, for each of the plurality of test images, the server system applies (1112) an inverse of the respective transformation to at least a portion of the test image to obtain a respective regularized version of the corresponding portion of the test image, such that the reference markers captured in the respective regularized versions of the plurality of test images share an image-independent location and orientation. For example, after reversing the respective rotation and translation experienced by each composite object relative to the standard location and orientation of the reference marker in the predefined common layout in the test image, e.g., by applying the inverse of the respective transformation that has been obtained in the previous step on the test image, the reference marker becomes the anchor by which the test image is shifted and rotated such that all the components of the composite object are located at their respective locations according to the predefined common layout, and can be easily extracted for recognition independent of the other components.

In some embodiments, quantitatively determining a respective transformation from the predefined contour of the reference marker in the predefined common layout to a respective anchor contour corresponding to the reference marker as captured in the test image comprises: (1) extracting a plurality of contours from the test image (e.g., by binarizing the test image, and identifying pixels along boundaries between pixel value transitions); (2) calculating a corresponding total area of each of the plurality of contours extracted from the test image (e.g., by first connecting adjacent pixels that are situated at pixel value transition boundaries to obtain an enclosed area for calculating the total area); and (3) identifying the respective anchor contour from among the plurality of contours extracted from the test image in accordance with a determination that a difference between a total area of the reference marker in the predefined common layout and the corresponding total area of the anchor contour meets area-difference criteria. For example, the area-difference criteria require that a difference in total area between two contours in comparison is below a threshold value (e.g., ±10%, ±5%, ±1%, ±0.5%, ±0.2%, etc.) in order for the area-difference criteria to be met.

In some embodiments, when the composite object is a complex object with complex parts, a lot of contours will be detected in the test image using conventional simple contour detection methods. The contours that are detected within the test image may correspond to internal structures of the components, the outlines of the components, or shadows, as well as the reference marker in the composite object. Using the total area to filter out contours that correspond to internal structures and shadows, which typically make small contours or large contours that do not match the size of the reference marker, is a quick and simply way to identify just a few good candidate contours for the reference marker from a large number of contours detected in the test image. Furthermore, total area is not affected by the translation and rotation of the composite object when the test image is captured, and serves as a good first filter for more detailed image analysis.

In some embodiments, the reference marker is designed to have a shape and size that are distinct from most common shapes and sizes of the contours that may result from other components and structure of the composite object. For example, the reference marker may be designed after a large number of training images of sample composite objects are analyzed and distribution of the total areas of the contours detected in the training images statistically measured. In some embodiments, the reference marker is optionally designed to have a total size that is at least 10% different from the sizes of over 90% of the contours detected in the training images. For example, the threshold difference is optionally set at a 10% difference of the size of the reference marker. In some embodiments, the size of the reference marker is adjustable for different composite object by printing or pressing a mark on the surface of the product or accessary box. In some embodiments, the design of the reference mark is based on the available space on the product or accessary box, a rectangular shape or other polygonal shapes with non-uniform edge lengths may be preferable because it is easy to change the size and easy to identify a rotation of the shape.

In some embodiments, identifying the respective anchor contour from among the plurality of contours extracted from the test image further comprises: identifying, from among the plurality of contours extracted from the test image, two or more candidate anchor contours that meet the area-difference criteria. For example, from among all the contours extracted from the test image, identify the subset of contours that have total areas within 10% difference from the total area of the reference marker in the predefined common layout, and the subset of contours are used as candidate contours for subsequent shape evaluation.

In some embodiments, identifying the respective anchor contour from among the plurality of contours extracted from the test image further comprises: selecting the anchor contour from the two or more candidate contours based on relative closeness between the respective shape feature of each of the two or more candidate contours and a shape feature of the reference mark in the predefined common layout. There are more than one way to match the shape features of the candidate contours to the shape feature of the reference mark. In some embodiments, the center coordinates of each contour are determined, and the shape feature is calculated based on the number of local maximum distances from the center to each point along the candidate contour (e.g., the number represents the number of apexes of the shape). In some embodiments, the candidate contour with a shape that has the same number of apexes as the reference mark is selected as the anchor contour. In some embodiments, the contours are smoothed first (e.g., with a running average) before the distance between each point along the contour and the center of the contour is calculated. In some embodiments, the closeness of the shape is determined based on a shape model. For example, the shape feature of the reference marker is learned by the computer using training images containing only the reference marker (e.g., the image is a cropped image containing only the reference mark), and the portions of test images containing the candidate contours are cropped out and used as input for shape recognition. The candidate contour that is recognized as the reference marker by the computer is selected as the anchor contour. In some embodiments, shape distances are computed between each candidate contour and the reference marker in the predefined common layout, and the candidate contour that has the smallest shape distance from the reference marker is selected as the anchor contour. Regardless of the technique that is used to identify the anchor contour from the candidate contour, the technique must be designed such that the identification can occur even when the reference markers in the test images are shifted and/or rotated relative to the position and orientation as indicated in the predefined common layout.

In some embodiments as discussed with reference to FIGS. 4D-4F and 4J, quantitatively determining a respective transformation from a predefined contour of the reference marker in the predefined common layout to a respective anchor contour corresponding to the reference marker as captured in the test image includes: (1) obtaining center coordinates of the respective anchor contour in the test image (e.g., after the respective anchor contour corresponding to the reference marker as captured in the test image is identified; (2) calculating a translation offset (e.g., the translation part of the transformation) between center coordinates of the respective anchor contour in the test image and center coordinates of the reference marker in the predefined common layout; (3) generating a first histogram Di(Theta') of distances between the center coordinates of the respective anchor contour and each of a sequence of n equally spaced points around the respective anchor contour (e.g., adjacent points are 360/n degrees apart or 360/m degrees apart with m>n and n points sequentially located to each other) (e.g., FIG. 4E); (4) generating a second histogram Di (Theta) of distances between the center coordinates of the reference marker and each of a sequence of n equally spaced points around a contour of the reference marker as specified in the predefined common layout (e.g., FIG. 4F); (5) determining an angular shift ($\Delta\theta$) on the first histogram that will cause the histogram to achieve alignment with the second histogram (e.g., when the distance between the first histogram and the second histogram in a continuous 360-degree range reaches a minimum value with that angular shift applied to the first histogram); and (6) using the translation offset and the angular shift as the respective transformation from the predefined contour of the reference marker in the predefined common layout to the respective anchor contour corresponding to the reference marker as captured in the test image.

The server system further performs (1114) independent automated inspection on each of two or more sub-portions of the respective regularized versions of the test images. In some embodiments, each sub-portion of the respective regularized versions of the test images corresponds to a respective one of the two or more components of the respective composite object or of two or more objects of the accessory pack captured in the test image. In some embodiments, each sub-portion of the test image is extracted using a mask (e.g., mask 602, 604, and 606, FIG. 6A) corresponding to the sub-portion. The mask opening has coordinates that are offset by predefined distances (e.g., in the x and y directions) from the reference marker (e.g., the center of the reference mark) in the predefined common layout. The extracted portion of the test image are processed using an independent image analysis model that are specially trained for recognizing the component or its presence/absence, or examining its state or defects, etc., depending on the requirements of the production line. Once the independent image analysis for each of the two or more sub-portions of the respective regularized versions of the test image has been performed, the results of the image analysis are integrated to generate a report. For example, if a particular accessary is determined to be missing from one of the compartment of the accessary box based on the image analysis of the portion of the test image that corresponds to the compartment designed for holding that particular accessary, an error report is generated indicating the type of accessary that is missing from the accessary box for the accessary pack corresponding to the currently analyzed test image. Once the report is generated, the accessary box can be picked up by a robot arm or a worker for remediation, e.g., adding the required accessary. If everything seems in order with respect to the image analysis on all the sub-portions of the test image, a report is generated indicating that the composite object corresponding to the current test image has passed inspection.

In some embodiments, quantitatively determining a respective transformation from the predefined contour of the reference marker in the predefined common layout to a respective anchor contour corresponding to the reference marker as captured in the test image comprises: after the respective anchor contour corresponding to the reference marker as captured in the test image is identified, obtaining an ordered sequence (e.g., a clockwise or counterclockwise sequence) of key coordinates (e.g., the four corners) for a minimum bounding rectangle (e.g., a bounding box or envelope) of the respective anchor contour in the test image (e.g., FIG. 4C). In some embodiments, obtaining the minimum bounding rectangle can be achieved using any known methods for determining the maximum extends of a two-dimensional object (e.g., the anchor contour). In some embodiments, the server system also obtains an ordered sequence of key coordinates for a minimum bounding rectangle of the reference mark in the predefined common layout (e.g., FIG. 4C). In some embodiments, based on the ordered sequences of key points for the minimum bounding rectangles of the reference mark in the predefined common layout and the anchor contour in the test image, the server system determines a respective affine transformation (e.g., the affine transformation is the respective transformation from a predefined contour of the reference mark in the predefined common layout to a respective anchor contour corresponding to the reference mark as captured in the test image) from the minimum bounding rectangle of the reference mark in the predefined common layout to the minimum bounding rectangle of the respective anchor contour.

In some embodiments, applying an inverse of the respective transformation to at least a portion of the test image to obtain a respective regularized version of the test image, such that the reference markers captured in the respective regularized versions of the plurality of test images share an image-independent location and orientation, further comprises: applying an inverse of the affine transformation (as determined above) to at least a portion of the test image. For example, the inverse of the affine transformation is applied to a minimum bounding rectangle that is defined based on the location of the minimum bounding rectangle of the anchor contour in the test image that will include all the components of the composite object and the reference mark based on the locations and dimensions set forth in the predefined common layout. In some embodiments, the portion of the test image includes the reference mark and the two or more components of the composite object.

In some embodiments, performing independent automated inspection on each of two or more sub-portions of the respective regularized versions of the test images includes: for the respective regularized version of each of the plurality of test images, (1) extracting a first sub-portion of the respective regularized version of the test image at a location corresponding to a first component of the two or more components in accordance with a location of the first component as specified in the predefined common layout; (2) extracting a second sub-portion of the respective regularized version of the test image at a location corresponding to a second component of the two or more components in accordance with a location of the second component as specified in the predefined common layout; (3) performing object inspection on the first sub-portion of the respective regularized version of the test image based on a first model trained on training images containing the first component and not containing the second component; and (4) performing object inspection on the second sub-portion of the respective regularized version of the test image based on a second model trained on training images containing the second component and not containing the first component. In some embodiments, the extraction of the first or second sub-portion of the respective regularized version of the test image includes using a respective mask with a window (e.g., a minimum enclosing rectangle for the first component or for the second component respectively, FIGS. 6A-6C) at a location that corresponds to the respective location of the first component or the second component in accordance with the location of the first component or the second component on the predefined common layout. Alternatively, a copy of the regularized version is cropped to leave only the minimum enclosing rectangle for the first component or the second component in the image. More detailed discussion regarding automated inspection are discussed with reference to the method 1150 of FIG. 11B below.

FIG. 11B is a flow diagram illustrating a method 1150 of performing an automated object inspection on an assembly line, in accordance with some embodiments. In some embodiments, the steps of the method 1150 are performed by a server system (e.g., server system 152, FIG. 1B; server system 200, FIG. 2) that serves one or more assembly lines or quality assurance stations. In some other embodiments, the steps of method 1150 are performed by a mobile device (e.g., mobile device 156, FIG. 1B) that is carried by mobile quality assurance personnel. In some other embodiments, the steps of method 1150 are performed by one or more edge devices (e.g., edge devices 104-1, 104-2, . . . 104-n, FIGS. 1A-1B) located at a product assembly line or quality assurance station. In some embodiments, the steps of the method 1150 may be performed by any combination of one or more edge devices, the server system, and the mobile device.

In some embodiments, the edge device 104 includes a camera (e.g., a color camera, a black/white camera, an infrared camera) for capturing images of assembled products or accessories. In some embodiments, the edge devices include various other types of sensors (e.g., weight sensors, touch-sensors, vibration sensors, sound sensors, haptic sensors, temperature sensors, light sensors, movement sensors, etc.) for collecting information about the state of the assembled products and assembly lines. In some embodiments, the edge devices are positioned at fixed locations around the assembly lines or inspection stations. In some embodiments, the edge devices are actuated and positioned by one or more robotic arms around the assembly lines or inspection stations. Method 1150 of FIG. 11B corresponds to instructions stored in a computer memory or computer readable storage medium (e.g., memory 206 of the server system 200, FIG. 2).

In performing the method 1150, the server system obtains (1152) a plurality of test images (e.g., including a test image 802, FIG. 8A). In some embodiments, the test images are captured by one or more edge devices 104 (e.g., a camera 104-1, FIG. 1A) located over an assembly line (e.g., the assembly line 100, FIG. 1A) or a quality assurance station. In some embodiments, each test image captures a respective one of a plurality of composite objects. In some embodiments, the respective composite object (e.g., the product 122, FIG. 1A) corresponds to a multi-component product. In some embodiments, the respective composite object corresponds to an accessory pack including multiple objects (e.g., the accessory pack 122 including multiple objects 140, 142, and 144, FIG. 1A) that have been assembled in accordance with a predefined common layout. In some embodiments, the common layout is a blueprint of the multi-component product or the accessary pack. Alternatively, the common layout is an image captured by the camera located over the assembly line of a standard example of the multi-component product or the accessary pack placed at a standard location (e.g., upright and squarely aligned in the center of the table) on the assembly line or quality assurance station for the plurality of composite objects.

In some embodiments, the predefined common layout specifies respective positions for multiple components of a respective composite object, and a predefined location and orientation for a reference marker (e.g., reference marker 146, FIG. 1A) in the respective composite object. In some embodiments, user inputs are used to identify the different objects. In some embodiments, a reference marker is not necessarily included in the layout. In some embodiments, the composite object is a product including multiple parts that are connected to one another in accordance with a predefined design. For example, a composite object includes an electric fan including a head coupled to a platform. In another example, the composite object includes a refrigerator with crisper boxes and wire racks inside. In some embodiments, the predefined common layout specifies respective positions for various accessories (e.g., electric cables, battery pack, instruction manual, a tool kit, etc.) that are packed in various compartments of the accessary box (e.g., the accessary pack 122, FIG. 1A).

In some embodiments, each test image captures respective portions of a corresponding composite object that contains the two or more components and the reference marker, and captures at least a portion of a surrounding environment of the corresponding composite object. For example, each time when a newly assembled product or accessary pack is placed on a table along the assembly line or the quality assurance station, the camera (e.g., the camera 104-1, FIG. 1A) placed at a fixed location or controlled by a robotic arm captures an image of the product or accessary pack from above (e.g., as shown in FIG. 1A). In an actual production scenario, the location and orientation of the product or accessary pack are not always exactly the same. For example, the products or accessary packs may be dropped and/or pushed into the camera view after they are assembled, and they are all of slightly different lateral positions and rotational angles on the table, even if they are all laid flat on the table. As discussed with reference to FIGS. 3B-3E, in some embodiments, the purposes of the inspection via the images optionally includes inspection for defects (e.g., visual defects or surface defects) including, but not limited to, scratches, abrasion, corrosion, debris, cracks, blemishes, broken off pieces. In some embodiments, the purposes of the inspection via the images include inspection for missing parts, such as missing items in certain holes of the accessary box, missing a screw in a screw hole. In some embodiments, the purposes of the inspection via the images include inspection for inaccurate positioning of the parts, for example, when wire rack of the refrigerator is not properly inserted into the sliding track, or when electric cable and battery pack are swapped in their respective compartments in the accessary box.

The server system further processes each of the plurality of test images as discussed in the following processes. In some embodiments, the processing of the images can be performed serially as each product or each accessary pack is placed on the inspection table along the assembly line and a picture of the product or the accessary pack is taken. In some embodiments, the images from multiple product lines may be processed in parallel.

For each of the plurality of test images, the server system performs (1154) independent object inspection on each of two or more sub-portions of the test image (or the respective regularized versions thereof). In some embodiments, each sub-portion of the test image corresponds to a respective one of the two or more components of the respective composite object captured in the test image.

In performing the independent object inspection of the test image, the server system segments (1156) the test image (e.g., the test image 802, FIG. 8A) into at least a first sub-portion (e.g., sub-portion 804, FIG. 8A) of the test image and a second sub-portion (e.g., sub-portion 806, FIG. 8A) of the test image. In some embodiments, the first sub-portion of the test image contains a first component (e.g., object 140, FIG. 8A) and not containing a second component (e.g., object 144, FIG. 8A) of the two or more components (e.g., objects 140, 142, and 144, FIG. 8A). In some embodiments, the second sub-portion of the test image containing the second component (e.g., object 144, FIG. 8A) and not containing the first component (e.g., object 140, FIG. 8A) of the two or more components The server system performs (1158) object inspection on the first sub-portion (e.g., sub-portion 804, FIG. 8A) of the test image using a first subset of information channels (e.g., information channels 810, 812, 814, and 816, FIG. 8A) of the test image and a first model trained on a first set of training images (e.g., training images 702, FIG. 7A) containing the first component (e.g., object 140) and not containing the second component (e.g., object 144).

The server system performs (1160) object inspection on the second sub-portion (e.g., sub-portion 806, FIG. 8B) of the test image using a second subset of information channels (e.g., information channels 834, 836, 838, and 840, FIG. 8B) of the test image that are distinct from the first subset of information channels, and a second model trained on a second set of training images containing the second component (e.g., object 144) and not containing the first component (e.g., object 140).

In some embodiments, segmenting the test image into at least a first sub-portion of the test image and a second sub-portion of the test image includes (1) detecting user inputs (e.g., user input 604, FIG. 6A) respectively directed to a first location (e.g., a circle 606, FIG. 6A) in the test image (e.g., the test image 602, FIG. 6A) and a second location (e.g., a square 608, FIG. 6A) in the test image; (2) creating a first mask (e.g., mask 610, FIG. 6A) for the test image to extract the first sub-portion (e.g., sub-portion 804, FIG. 8A) of the test image in accordance with the first location; (3) creating a second mask (e.g., mask 612, FIG.

6A) for the test image to extract the second sub-portion (e.g., sub-portion 806, FIG. 8B) of the test image in accordance with the second location; and (4) extracting the first sub-portion of the test image and the second sub-portion of the test image using the first mask and the second mask, respectively (e.g., FIG. 8A). In some embodiments, the server system also detects a contour of the first component (e.g., object 140) around the first location in the test image, and a contour of the second component (e.g., object 144) around the second location in the test image. In some embodiments, the server system performs an initialization process (e.g., FIGS. 6A-6C) to create masks based on coordinates for respective sub-portions before the training process (e.g., FIGS. 7A-7C) and the testing process (e.g., FIGS. 8A-8D).

In some embodiments, prior to or while performing segmenting the test image into at least a first sub-portion of the test image and a second sub-portion of the test image, the server system applies a respective transformation to the test image to align a reference mark captured in the test image and a corresponding reference mark specified in a predefined common layout of the plurality of composite objects as discussed with reference to FIGS. 4A-4J and 11A. For example, in some embodiments, the computer quantitatively determines an affine transformation from a predefined contour of the reference marker in the predefined common layout to a respective anchor contour corresponding to the reference marker as captured in the test image. Then, the computer applies an inverse of the affine transformation to at least a portion of the test image to obtain a respective regularized version of the test image, such that the reference markers captured in the respective regularized versions of the plurality of test images share an image-independent location and orientation. By applying the inverse of the affine transformation that has been obtained in the previous processes (e.g., FIGS. 4A-4J and 11A) on the test image, the reference mark becomes the anchor by which the test image is shifted and rotated such that all the components of the composite object are located at their respective locations according to the predefined common layout, and can be easily extracted for recognition independent of the other components In some embodiments, after the respective transformation is applied to the test image, the server system extracts (e.g., using a mask (such as mask 610) or mathematically specifying a minimum bounding box) the first sub-portion (e.g., sub-portion 804, FIG. 8A) of the test image in accordance with a location of the first component specified in the predefined common layout of the plurality of composite objects. The server also extracts (e.g., using a mask (such as mask 612) or mathematically specifying a minimum bounding box) the second sub-portion (e.g., sub-portion 806, FIG. 8A) of the test image in accordance with a location of the second component specified in the predefined common layout of the plurality of composite objects.

In some embodiments, performing object inspection on the first sub-portion of the test image using a first subset of information channels of the test image and a first model trained on a first set of training images containing the first component and not containing the second component, includes separating test image into respective single-channel images corresponding to a plurality of information channels of the test image. Correspondingly, each of the sub-portions of the test image is also separated into a corresponding set of single-channel sub-portions of the test image for the plurality of information channels. For each information channel of the first subset of information channels, the server system obtains a first sub-portion of the respective single-channel image corresponding to said each information channel. In some embodiments, the first sub-portion of the respective single-channel image corresponds to the first sub-portion of the test image containing the first component. In some embodiments, the server system performs object inspection on the first sub-portion of the respective single-channel image of the test image corresponding to said each information channel, using a respective single-channel sub-model (e.g., sub-model $f1(x)$, $f2(x)$, $f3(x)$, and $f4(x)$, FIGS. 7A and 8A) of the first model that is trained (e.g., FIGS. 7A-7C) on single-channel training images of the first component captured with said each information channel.

In some other embodiments, the server system first segments (e.g., FIG. 8A and step 1156 of FIG. 11B) the test image into a plurality of sub-portions, including the first sub-portion 804 and the second sub-portion 806. Then the server system separates each sub-portion into respective single-channel sub-portions (e.g., single-channel sub-portion 810, 812, 814, and 816, FIG. 8A) corresponding to a plurality of information channels of each sub-portion of the test image. Then the server system performs object inspection on the respective single-channel sub-portions corresponding to said each information channel, using a respective single-channel sub-model (e.g., sub-model $f1(x)$, $f2(x)$, $f3(x)$, and $f4(x)$, FIGS. 7A and 8A) of the first model that is trained (e.g., FIGS. 7A-7C) on single-channel training images of the first component captured with said each information channel.

For example, in an example scenario where the test image includes four information channels (RGBD), representing three color channels (RGB) and one depth channel (D), the test image is first separated into four single-channel images each corresponding to a respective one of the four channels. The single-channel image of each channel includes a single value for that channel at each pixel location of the test image. For each information channel of the first subset of information channels (e.g., the R channel and the D channel, respectively), object inspection is performed on the first sub-portion of the corresponding single-channel image of the test image (e.g., the single-channel images for the R channel and D channel, respectively), using a single-channel sub-model of the first model (e.g., the sub-model for the R channel and the sub-model for the D channel, respectively) that is trained on single-channel training images of the first component for that channel (e.g., R channel images of the first component, and D channel images of the first component, respectively).} {In some embodiments, performing object inspection on the second sub-portion of the test image using a second subset of information channels of the test image and a second model trained on a second set of training images containing the second component and not containing the first component, includes: after separating the test image into respective single-channel images corresponding to the plurality of information channels of the test image, for each information channel of the second subset of information channels that are distinct from the first subset of information channels: obtaining the second sub-portion of the respective single-channel image corresponding to said each information channel, wherein the second sub-portion of the respective single-channel image corresponds to the second sub-portion of the test image that includes the second component; and performing object inspection on the second sub-portion of the respective single-channel image of the test image corresponding to said each information channel, using a respective single-channel sub-model of the second model that is trained on single-channel training images of the second component captured with said each information channel. Continue with the example of the test image with the four channels, for each information channel of the second subset of information channels (e.g., the G channel and the D channel, respectively), object inspection is performed on the second sub-portion of the corresponding single-channel image of the test image (e.g., the single-channel images for the G channel and D channel, respectively), using a single-channel sub-model of the second model (e.g., the sub-model for the G channel and the sub-model for the D channel, respectively) that is trained on single-channel training images of the second component for that channel (e.g., G channel images of the first component, and D channel images of the first component, respectively).

In some embodiments, the composite object is an accessary box 122 containing a red cup (e.g., object 140) in a first round compartment and a green cable (e.g., object 144) in a second square compartment. The test image capturing the composite box is preprocessed to align the locations of the compartments in the test image with a predefined layout (e.g., based on location of a reference mark on the box as discussed with reference to FIGS. 4A-4J and 11A). The first sub-portion 804 of the test image corresponds to the first compartment 140 and the second sub-portion 806 of the test image corresponds to the second compartment 144. Because the component of interest in the first compartment is a red cup, the channels that are most relevant to the inspection (e.g., presence or absence of the component, whether the cup is properly inserted into the compartment) are the R channel and D channel, while the G and B channels contain little relevant information in the inspection of the first sub-portion of the test image. Similarly, the component of interest in the second compartment is a green cable, the channels that are most relevant to the inspection are the G channel and D channel, while the R channel and B channel contain little relevant information in the inspection of the second sub-portion of the test image.

In some embodiments, when processing the first sub-portion of the test image, the first sub-portion of the single-channel image for the R channel is processed by a single-channel sub-model (e.g., $f1(x)$) that is trained on training images of the red cup in the first compartment without the interference of image data on the second compartment or the green cable, or the interference of data from the GBD channels. In addition, the first sub-portion of the single-channel image for the D channel is processed by a single-channel sub-model (e.g., $f4(x)$) that is trained on training images of the red cup in the first compartment without the interference of image data on the second compartment or the green cable, or the interference of data from the RGB channels. When processing the second sub-portion of the test image, the second sub-portion of the single-channel image for the G channel is processed by a single-channel sub-model (e.g., $f6(x)$) that is trained on training images of the green cable in the second compartment without the interference of image data on the first compartment or the red cup, or the interference of data from the RBD channels. In addition, the second sub-portion of the single-channel image for the D channel is processed by a single-channel sub-model (e.g., $f8(x)$) that is trained on training images of the green cable in the second compartment without the interference of image data on the first compartment or the red cup, or the interference of data from the RGB channels. By isolating the individual components, and the individual information channels, the models are simpler, faster, and more sensitive (e.g., due to less interference of irrelevant information from other objects or channels), producing higher inspection accuracy.

In some embodiments, performing object inspection on the first sub-portion of the test image using a first subset of information channels of the test image and a first model trained on a first set of training images containing the first component and not containing the second component, includes generating an inspection result indicating at least one of presence or position of the first component in the composite object by combining inspection results from respective information channels of the first subset of information channels with corresponding weights for the respective information channels.

In some embodiments, the weights are assigned to the different channels for the inspection of different components of the composite object based on relative recognition accuracies for each of the different channels based on training performed on the different channel for different components of the composite object. In some embodiments, the weights are assigned by a user who has visually inspected the components of the composite object and knows which channels are most effective in inspecting each component of the composite object. In some embodiments, the weights for the respective channels for the first component may be different from the weights for the respective channels assigned to the second component.

For example, for the first component, the result from the R channel indicates that there is a 50% chance that the first component is present in the first compartment in the test image, and result from the D channel indicates that the first compartment is 40% filled, the respective weights assigned to the R channel and D channel for the first component are 0.7 and 0.3 respectively, thus the combined result indicates that the first compartment is not properly filled (e.g., 0.5*0.7+0.4*0.3=0.47<threshold score). However, if the result from the R channel indicates that there is a 80% chance that the first component is present in the first compartment in the test image, and result from the D channel indicates that the first compartment is less than 40% filled, and the combined result indicates that the first compartment is properly filled (e.g., 0.8*0.7+0.4*0.3=0.70>threshold score).

For the second component, the weight may be different (e.g., D channel is less import) for the combination of results because the characteristics of the components are different. For example, the respective weights assigned to the G channel and D channel for the first component are 0.9 and 0.1 respectively. The result from the G channel indicates that there is a 50% chance that the second component is present in the second compartment in the test image, and result from the D channel indicates that the second compartment is 40% filled, and the combined result indicates that the second compartment is not properly filled (e.g., 0.5*0.9+ 0.4*0.1=0.49<threshold score). However, if the result from the G channel indicates that there is a 80% chance that the second component is present in the second compartment in the test image, and result from the D channel indicates that the first compartment is less than 40% filled, and the combined result indicates that the first compartment is properly filled (e.g., 0.8*0.9+0.4*0.1=0.76>threshold score).

In the above examples, the components are pure colored, and the channel information is dominated by one color channel. In a more common usage scenario, each of the channels would have some information content that are relevant to the inspection result, and the channels are selected based on relative recognition accuracies for each of the different channels based on training performed on the different channel for different components of the composite object.

In some embodiments, the computing device is a server that is in communication with an edge device or a peripheral device (e.g., one or more cameras configured to capture images of the composite objects on the assembly line) and that is in communication with a user device (e.g., a mobile device configured to receive user inputs and display images to the user). In some embodiments, the server system receives a user instruction for training the first model. In accordance with receiving the user instruction for training the first model, the server system trains images using the edge device. In some embodiments, the server system further receives a user input marking respective first portions of the training images and corresponding labels for the first portions of the training images. In some embodiments, the corresponding labels include a first classifier and a second classifier for the first component captured in the training images. In some embodiments, the first classifier and the second classifier are Pass (P), No Pass (NP) labels for a first parameter of inspection for the first component (e.g., the first parameter may be object presence, object position, object non-defective, etc.). In some embodiments, the server system further generates the first model based on the respective first portions of the training images and the corresponding labels provided in the user inputs. In some embodiments, the training of the first model is performed based on first portions of single-channel images of each of multiple information channels of the training images. The training results in multiple single-channel sub-models of the first model, with different inspection accuracies. The relative accuracies of the sub-models are used to assign different weights to the different information channels and selecting the most relevant information channels for subsequent inspection of test images.

In some embodiments, in accordance with a determination that a model accuracy of the first model meets a first threshold accuracy, the server system presents a notification on the user device indicating that training of the first model is complete. For example, once the user knows that the training of the first model is complete, the user can focus her time and effort on training other types of inspection issues, or other components of the composite object for which the training is not yet complete.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of performing automated object inspection, comprising:
   at a computing device having one or more processors and memory:
      obtaining a plurality of test images, each test image capturing a respective one of a plurality of composite objects comprising two or more components;
      for each of the plurality of test images:
         performing independent object inspection on each of two or more sub-portions of the test image, wherein each sub-portion of the test image corresponds to a respective one of the two or more components of the respective composite object captured in the test image, wherein performing the independent object inspection includes:
            segmenting the test image into at least a first sub-portion of the test image containing a first component and not containing a second component of the two or more components, and a second sub-portion of the test image containing the second component and not containing the first component of the two or more components, including:
               detecting user inputs respectively directed to a first location in the test image and a second location in the test image;
               creating a first mask for the test image to extract the first sub-portion of the test image in accordance with the first location;
               creating a second mask for the test image to extract the second sub-portion of the test image in accordance with the second location; and
               extracting the first sub-portion of the test image and the second sub-portion of the test image using the first mask and the second mask, respectively;
         performing object inspection on the first sub-portion of the test image using a first subset of information channels of the test image and a first model trained on a first set of training images containing the first component and not containing the second component; and
         performing object inspection on the second sub-portion of the test image using a second subset of information channels of the test image that are distinct from the first subset of information channels, and a second model trained on a second set of training images containing the second component and not containing the first component.

2. The method of claim 1, wherein segmenting the test image into at least a first sub-portion of the test image and a second sub-portion of the test image includes:
   applying a respective transformation to the test image to align a reference mark captured in the test image and a corresponding reference mark specified in a predefined common layout of the plurality of composite objects; and
   after the respective transformation is applied to the test image:
      extracting the first sub-portion of the test image in accordance with a location of the first component specified in the predefined common layout of the plurality of composite objects, and
      extracting the second sub-portion of the test image in accordance with a location of the second component specified in the predefined common layout of the plurality of composite objects.

3. The method of claim 1, wherein performing object inspection on the first sub-portion of the test image using a first subset of information channels of the test image and a first model trained on a first set of training images containing the first component and not containing the second component, includes:
separating test image into respective single-channel images corresponding to a plurality of information channels of the test image; and
for each information channel of the first subset of information channels:
obtaining a first sub-portion of the respective single-channel image corresponding to said each information channel, wherein the first sub-portion of the respective single-channel image corresponds to the first sub-portion of the test image containing the first component; and
performing object inspection on the first sub-portion of the respective single-channel image of the test image corresponding to said each information channel, using a respective single-channel sub-model of the first model that is trained on single-channel training images of the first component captured with said each information channel.

4. The method of claim 3, wherein performing object inspection on the first sub-portion of the test image using a first subset of information channels of the test image and a first model trained on a first set of training images containing the first component and not containing the second component, includes:
generating an inspection result indicating at least one of presence or position of the first component in the composite object by combining inspection results from respective information channels of the first subset of information channels with corresponding weights for the respective information channels.

5. The method of claim 1, wherein the computing device is a server that is in communication with a peripheral device and that is in communication with a user device, and the method includes:
receiving a user instruction for training the first model;
in accordance with receiving the user instruction for training the first model, collecting training images using the peripheral device;
receiving user input marking respective first portions of the training images and corresponding labels for the first portions of the training images, the corresponding labels including a first classifier and a second classifier for the first component captured in the training images; and
generating the first model based on the respective first portions of the training images and the corresponding labels provided in the user inputs.

6. The method of claim 5, including:
in accordance with a determination that a model accuracy of the first model meets a first threshold accuracy, presenting a notification on the user device indicating that training of the first model is complete.

7. A server system, comprising:
one or more processors; and
memory storing one or more programs for execution by the one or more processors, the one or more programs including instructions for:
obtaining a plurality of test images, each test image capturing a respective one of a plurality of composite objects comprising two or more components;
for each of the plurality of test images:
performing independent object inspection on each of two or more sub-portions of the test image, wherein each sub-portion of the test image corresponds to a respective one of the two or more components of the respective composite object captured in the test image, wherein performing the independent object inspection includes:
segmenting the test image into at least a first sub-portion of the test image containing a first component and not containing a second component of the two or more components, and a second sub-portion of the test image containing the second component and not containing the first component of the two or more components, including:
detecting user inputs respectively directed to a first location in the test image and a second location in the test image;
creating a first mask for the test image to extract the first sub-portion of the test image in accordance with the first location;
creating a second mask for the test image to extract the second sub-portion of the test image in accordance with the second location; and
extracting the first sub-portion of the test image and the second sub-portion of the test image using the first mask and the second mask, respectively;
performing object inspection on the first sub-portion of the test image using a first subset of information channels of the test image and a first model trained on a first set of training images containing the first component and not containing the second component; and
performing object inspection on the second sub-portion of the test image using a second subset of information channels of the test image that are distinct from the first subset of information channels, and a second model trained on a second set of training images containing the second component and not containing the first component.

8. The server system of claim 7, wherein segmenting the test image into at least a first sub-portion of the test image and a second sub-portion of the test image includes:
applying a respective transformation to the test image to align a reference mark captured in the test image and a corresponding reference mark specified in a predefined common layout of the plurality of composite objects; and
after the respective transformation is applied to the test image:
extracting the first sub-portion of the test image in accordance with a location of the first component specified in the predefined common layout of the plurality of composite objects, and
extracting the second sub-portion of the test image in accordance with a location of the second component specified in the predefined common layout of the plurality of composite objects.

9. The server system of claim 7, wherein performing object inspection on the first sub-portion of the test image using a first subset of information channels of the test image and a first model trained on a first set of training images containing the first component and not containing the second component, includes:
  separating test image into respective single-channel images corresponding to a plurality of information channels of the test image; and
  for each information channel of the first subset of information channels:
    obtaining a first sub-portion of the respective single-channel image corresponding to said each information channel, wherein the first sub-portion of the respective single-channel image corresponds to the first sub-portion of the test image containing the first component; and
    performing object inspection on the first sub-portion of the respective single-channel image of the test image corresponding to said each information channel, using a respective single-channel sub-model of the first model that is trained on single-channel training images of the first component captured with said each information channel.

10. The server system of claim 9, wherein performing object inspection on the first sub-portion of the test image using a first subset of information channels of the test image and a first model trained on a first set of training images containing the first component and not containing the second component, includes:
  generating an inspection result indicating at least one of presence or position of the first component in the composite object by combining inspection results from respective information channels of the first subset of information channels with corresponding weights for the respective information channels.

11. The server system of claim 7, wherein the one or more processors are in communication with a peripheral device and that is in communication with a user device, and the one or more programs including instructions for:
  receiving a user instruction for training the first model;
  in accordance with receiving the user instruction for training the first model, collecting training images using the peripheral device;
  receiving user input marking respective first portions of the training images and corresponding labels for the first portions of the training images, the corresponding labels including a first classifier and a second classifier for the first component captured in the training images; and
  generating the first model based on the respective first portions of the training images and the corresponding labels provided in the user inputs.

12. The server system of claim 11, including:
  in accordance with a determination that a model accuracy of the first model meets a first threshold accuracy, presenting a notification on the user device indicating that training of the first model is complete.

13. A non-transitory computer-readable storage medium, storing one or more programs configured for execution by one or more processors of a server system, the one or more programs including instructions for:
  obtaining a plurality of test images, each test image capturing a respective one of a plurality of composite objects comprising two or more components;
  for each of the plurality of test images:
    performing independent object inspection on each of two or more sub-portions of the test image, wherein each sub-portion of the test image corresponds to a respective one of the two or more components of the respective composite object captured in the test image, wherein performing the independent object inspection includes:
      segmenting the test image into at least a first sub-portion of the test image containing a first component and not containing a second component of the two or more components, and a second sub-portion of the test image containing the second component and not containing the first component of the two or more components, including:
        detecting user inputs respectively directed to a first location in the test image and a second location in the test image;
        creating a first mask for the test image to extract the first sub-portion of the test image in accordance with the first location;
        creating a second mask for the test image to extract the second sub-portion of the test image in accordance with the second location; and
        extracting the first sub-portion of the test image and the second sub-portion of the test image using the first mask and the second mask, respectively;
      performing object inspection on the first sub-portion of the test image using a first subset of information channels of the test image and a first model trained on a first set of training images containing the first component and not containing the second component; and
      performing object inspection on the second sub-portion of the test image using a second subset of information channels of the test image that are distinct from the first subset of information channels, and a second model trained on a second set of training images containing the second component and not containing the first component.

14. The non-transitory computer-readable storage medium of claim 13, wherein segmenting the test image into at least a first sub-portion of the test image and a second sub-portion of the test image includes:
  applying a respective transformation to the test image to align a reference mark captured in the test image and a corresponding reference mark specified in a predefined common layout of the plurality of composite objects; and
  after the respective transformation is applied to the test image:
    extracting the first sub-portion of the test image in accordance with a location of the first component specified in the predefined common layout of the plurality of composite objects, and
    extracting the second sub-portion of the test image in accordance with a location of the second component specified in the predefined common layout of the plurality of composite objects.

15. The non-transitory computer-readable storage medium of claim 13, wherein performing object inspection on the first sub-portion of the test image using a first subset of information channels of the test image and a first model trained on a first set of training images containing the first component and not containing the second component, includes:
  separating test image into respective single-channel images corresponding to a plurality of information channels of the test image; and
  for each information channel of the first subset of information channels:

obtaining a first sub-portion of the respective single-channel image corresponding to said each information channel, wherein the first sub-portion of the respective single-channel image corresponds to the first sub-portion of the test image containing the first component; and performing object inspection on the first sub-portion of the respective single-channel image of the test image corresponding to said each information channel, using a respective single-channel sub-model of the first model that is trained on single-channel training images of the first component captured with said each information channel.

16. The non-transitory computer-readable storage medium of claim 15, wherein performing object inspection on the first sub-portion of the test image using a first subset of information channels of the test image and a first model trained on a first set of training images containing the first component and not containing the second component, includes:

generating an inspection result indicating at least one of presence or position of the first component in the composite object by combining inspection results from respective information channels of the first subset of information channels with corresponding weights for the respective information channels.

17. The non-transitory computer-readable storage medium of claim 13, wherein the one or more processors are in communication with a peripheral device and that is in communication with a user device, and the one or more programs including instructions for:

receiving a user instruction for training the first model;

in accordance with receiving the user instruction for training the first model, collecting training images using the peripheral device;

receiving user input marking respective first portions of the training images and corresponding labels for the first portions of the training images, the corresponding labels including a first classifier and a second classifier for the first component captured in the training images; and generating the first model based on the respective first portions of the training images and the corresponding labels provided in the user inputs.

* * * * *